(12) United States Patent
Han

(10) Patent No.: US 11,435,278 B2
(45) Date of Patent: Sep. 6, 2022

(54) HIGH-TEMPERATURE CONDENSATION PARTICLE COUNTER

(71) Applicant: TSI Incorporated, Shoreview, MN (US)

(72) Inventor: Hee-Siew Han, Minneapolis, MN (US)

(73) Assignee: TSI Incorporated, Shoreview, MN (US)

( * ) Notice: Subject to any disclaimer, the term of this patent is extended or adjusted under 35 U.S.C. 154(b) by 0 days.

(21) Appl. No.: 17/277,723

(22) PCT Filed: Sep. 20, 2019

(86) PCT No.: PCT/US2019/052113
§ 371 (c)(1),
(2) Date: Mar. 18, 2021

(87) PCT Pub. No.: WO2020/061433
PCT Pub. Date: Mar. 26, 2020

(65) Prior Publication Data
US 2021/0356374 A1 Nov. 18, 2021

Related U.S. Application Data

(60) Provisional application No. 62/734,626, filed on Sep. 21, 2018.

(51) Int. Cl.
*G01N 15/06* (2006.01)
*G01N 15/14* (2006.01)
*G01N 15/00* (2006.01)

(52) U.S. Cl.
CPC ........... *G01N 15/065* (2013.01); *G01N 15/14* (2013.01); *G01N 2015/0046* (2013.01);
(Continued)

(58) Field of Classification Search
CPC ................ G01N 15/065; G01N 15/14; G01N 2015/0046; G01N 2015/03; G01N 2015/0687; G01N 2015/1486
(Continued)

(56) References Cited

U.S. PATENT DOCUMENTS

2008/0186489 A1* 8/2008 Ahn ...................... G01N 15/065
356/337
2009/0031786 A1 2/2009 Takeuchi et al.
(Continued)

FOREIGN PATENT DOCUMENTS

JP 2014002035 1/2014
JP 2021531476 A 11/2021
(Continued)

OTHER PUBLICATIONS

"International Application Serial No. PCT US2019 052113, International Preliminary Report on Patentability dated Apr. 1, 2021", 6 pages.
(Continued)

*Primary Examiner* — Tri T Ton
(74) *Attorney, Agent, or Firm* — Schwegman Lundberg & Woessner, P.A.

(57) ABSTRACT

Various embodiments include an exemplary design of a high-temperature condensation particle counter (HT-CPC) having particle-counting statistics that are greatly improved over prior art systems since the sample flow of the disclosed HT-CPC is at least eight times greater than the prior art systems. In one embodiment, the HT-CPC includes a saturator block to accept directly a sampled particle-laden gas flow, a condenser block located downstream and in fluid communication with the saturator block, an optics block located downstream and in fluid communication with the condenser block, and a makeup-flow block having a con-
(Continued)

centric-tube design located in fluid communication with and between the condenser block and the optics block. The makeup-flow block being configured to reduce volatile contents from re-nucleating in the optics block. Other designs and apparatuses are disclosed.

13 Claims, 15 Drawing Sheets

(52) U.S. Cl.
CPC . *G01N 2015/03* (2013.01); *G01N 2015/0687* (2013.01); *G01N 2015/1486* (2013.01)

(58) Field of Classification Search
USPC .......... 356/36–42, 243.2, 335–343, 432–444
See application file for complete search history.

(56) References Cited

U.S. PATENT DOCUMENTS

| | | |
|---|---|---|
| 2014/0268476 A1 | 9/2014 | Han |
| 2015/0308940 A1* | 10/2015 | Blackford .......... G01N 15/0255 73/61.71 |

FOREIGN PATENT DOCUMENTS

| | | |
|---|---|---|
| KR | 20170023365 A | 3/2017 |
| WO | WO-03091708 A2 | 11/2003 |
| WO | WO-2020061433 A1 | 3/2020 |

OTHER PUBLICATIONS

"Korean Application Serial No. 10-2021-7011339, Notice of Preliminary Rejection dated May 11, 2021", with English translation, 5 pages.

"International Application Serial No. PCT/US2019/052113, International Search Report dated Jan. 10, 2020", 3 pgs.

"International Application Serial No. PCT/US2019/052113, Written Opinion dated Jan. 10, 2020", 4 pgs.

Gallar, C, et al., "A Variable Supersaturation Condensation Particle Sizer", Aerosol Science and Technology, vol. 40, (2006), 431-436.

"Japanese Application Serial No. 2021-515448, Notification of Reasons for Refusal dated Sep. 21, 2021", with machine English translation, 6 pages.

Rongchai, K, "High Temperature Condensation Particle Counter (HT-CPC)", 16th ETH-Conference on Combustion Generated Nanoparticles, (Jun. 26, 2012), 38 pages.

"European Application Serial No. 19863809.0,Response to Communication pursuant to Rules 161(2) and 162 EPC filed Nov. 8, 2021", 13 pgs.

"Japanese Application Serial No. 2021-515448, Response filed Dec. 16, 2021 to Notification of Reasons for Refusal dated Sep. 2021", w/ English claims, 10 pgs.

\* cited by examiner

SECTION A-A

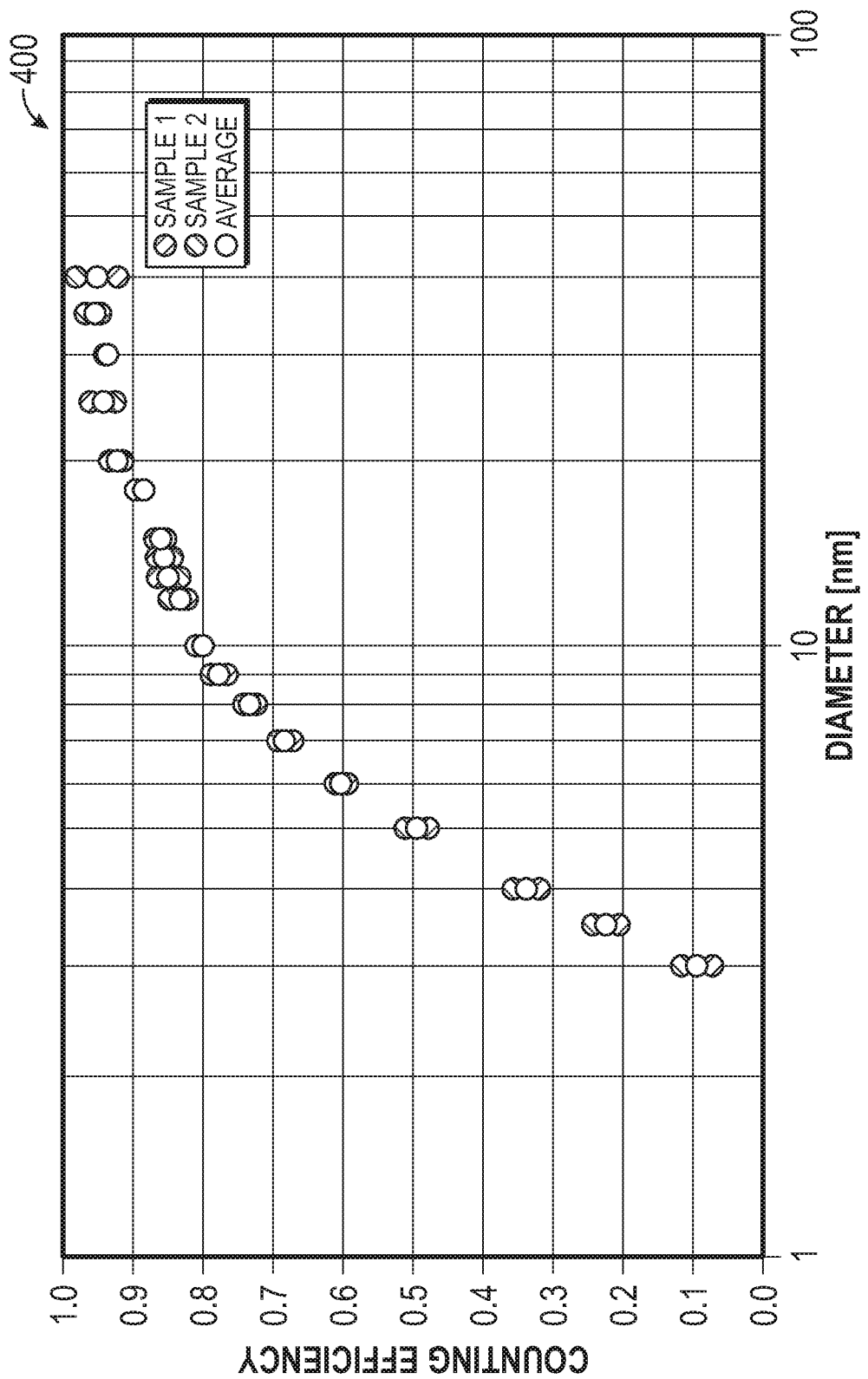

HIGH-TEMPERATURE CONDENSATION PARTICLE COUNTER

CLAIM OF PRIORITY

This patent application is a U.S. National-Phase Filing under 35 U.S.C. § 371 from International Application Number PCT/US2019/052113, filed 20 Sep. 2019, entitled, "HIGH-TEMPERATURE CONDENSATION PARTICLE," which claims priority to U. S. Provisional. Application Ser. No. 62/734,626, entitled, "HIGH-TEMPERATURE CONDENSATION PARTICLE COUNTER," filed 21 Sep. 2018; the disclosures of which are incorporated herein by reference in their entireties.

TECHNOLOGY FIELD

The disclosed subject matter is generally related to the field of counting particles from high-concentration emission sources. More specifically, the disclosed subject matter is related to particle counting and removal of volatile and semi-volatile particles from engine emissions without a need of a volatile particle remover (VPR).

BACKGROUND

A program started within the European Union (EU) entitled the Particle Measurement Programme (PMP), sponsored by the Working Group by the UN-ECE GRPE (Working Party on Pollution and Energy), was commissioned to develop new particle measurement techniques. The PMP focused partially on measuring particle emissions at low concentration levels and include details of test procedures to be used on, for example, approval testing of light-duty vehicles and heavy-duty engines. A volatile-particle remover (VPR) is currently used by the Particle Measurement Programme to remove volatile and semi-volatile particles from engine emissions. The VPR, operates at temperatures of up to 400° C. and requires significant quantities of power and filtered dilution air. In addition to the VPR, the specification set by the PMP for a condensation particle counter (CPC) $D_{50}$ cut-point is 23 nm, to avoid the possibility of the measurement of volatile artifacts that may occur in some circumstances.

However, it is arguable that the current PMP measurement system has at least two main drawbacks: (1) the system is complex, expensive, resource hungry, and bulky; and (2) there may be still be a significant number of solid particles below the stated 23 nm cut-point requirement.

Overall, the concept of a high-temperature condensation particle counter (HT-CPC) is to run the CPC at such a high temperature that condensable vapors will stay in vapor form (that is, not counted by the CPC) and have a much smaller $D_{50}$ cut-point so that the HT-CPC can measure all or substantially all solid particles that are not currently counted by a 23 nm cut-point CPC.

Consequently, by having the CPC operating at much higher temperatures, it is possible to achieve the objectives of removing volatile contents without the need for the VPR, and the large CPC cut-point (e.g., 23 nm or larger).

FIG. 1 shows a schematic diagram of a high-temperature condensation particle counter (HT-CPC) 100 of the prior art. The fundamental working principle of the HT-CPC 100 is generally the same as a butanol-based CPC, known in the art. The main differences are that a different working fluid is used, and saturator and condenser temperatures are operated at much higher temperatures (e.g., greater than 200° C.). The HT-CPC 100 includes a saturator block 103, a saturator-flow inlet 105, a porous silicon-carbide (SiC) diesel particle-filter (DPF) block 109, and a condenser block 113 that is thermally insulated from both an optical particle-counter 119 and the saturator block 103 by thermal barriers 115, 111, respectively.

With continued reference to FIG. 1, sample air is introduced into an aerosol inlet 101, downstream of the saturator block 103, so that no particles flow through the saturator block 103. The design of the HT-CPC 100 is similar to a TSI® Model 3025 or a TSI® Model 3776 CPC (available from TSI® Incorporated, 500 Cardigan Road, Shoreview, Minn., USA 55126). Nitrogen was used in the original test. The authors of the test suggested that filtered air could be used as well but no data were provided. The SiC DPF block 109 was formed from a silicon-carbide diesel particle-filter (DPF), which was cut at both ends, thereby rendering the DPF as a through-flow device. The SiC DPF block 109 also functioned as a wick for working fluid 107 placed within the saturator block 103. According to the test data, the SiC DPF block 109 wicked well and was stable at high temperature. The sample flow from the aerosol inlet 101 is merged with working-fluid vapor from the saturator block 105 prior to entering the condenser block 113, such that particles were substantially confined around a centerline of the condenser block 113. The condenser block 113 had a 5 mm outside diameter and was 100 mm in length.

The optical particle-counter 119, comprising a laser 121 and a detector 123, used an optics block from a TSI® Model 3034 single-box Scanning Mobility Particle Sizer Spectrometer (SNIPS). Two sheath flow inlets 117 delivered filtered air orthogonally into the optical particle counter 119 to reduce or prevent vapor from condensing and further served to keep particles from the aerosol inlet 101 from contaminating optical elements within the optical particle-counter 119. After the particles pass through the optical particle-counter 119, they exit through an outlet port 125.

The optical particle-counter 119 was run at 45° C., which was much lower than temperatures of the condenser block 113. Temperatures in the condenser block 113 were run at above 200° C. for all working fluids. The working fluids tested comprised perfluorinated polyether (Fomblin® Y 6/6 fluid), polyphenyl ether (Santovac® 5), and siloxanes (Dow Corning® DC704 and DC705 silicone-based oil types primarily used for diffusion pumps). However, only the siloxanes were found to achieve a reasonable counting efficiency.

The information described in this section is provided to offer the skilled artisan a context for the following disclosed subject matter and should not be considered as admitted prior art.

BRIEF DESCRIPTION OF THE DRAWINGS

FIG. 4A shows a counting-efficiency graph of various embodiments of the HT-CPC disclosed herein, the graph indicates counting efficiency as a function of particle diameter using sodium-chloride (NaCl) particles to test the HT-CPC;

DETAILED DESCRIPTION

The description that follows includes illustrative examples, devices, and apparatuses that embody various aspects of the disclosed subject matter. In the following description, for purposes of explanation, numerous specific details are set forth in order to provide an understanding of various embodiments of the inventive subject matter. It will be evident however, to those of ordinary skill in the art, that various embodiments of the disclosed subject matter may be practiced without these specific details. Further, well-known structures, materials, and techniques have not been shown in detail, so as not to obscure the various illustrated embodiments.

As used herein, the term "or" may be construed in an inclusive or exclusive sense. Additionally, although various exemplary embodiments discussed below focus on counting particles from high-concentration emission sources, the disclosed subject matter is also related to particle counting and removal of volatile and semi-volatile particles from engine emissions without a need of a volatile particle remover (YPR). Upon reading and understanding the disclosure provided herein, a person of ordinary skill in the art will readily understand that various combinations of the techniques and examples may all be applied serially or in various combinations. As an introduction to the subject, a few embodiments will be described briefly and generally in the following paragraphs, and then a more detailed description, with reference to the figures, will ensue.

Figure 1:
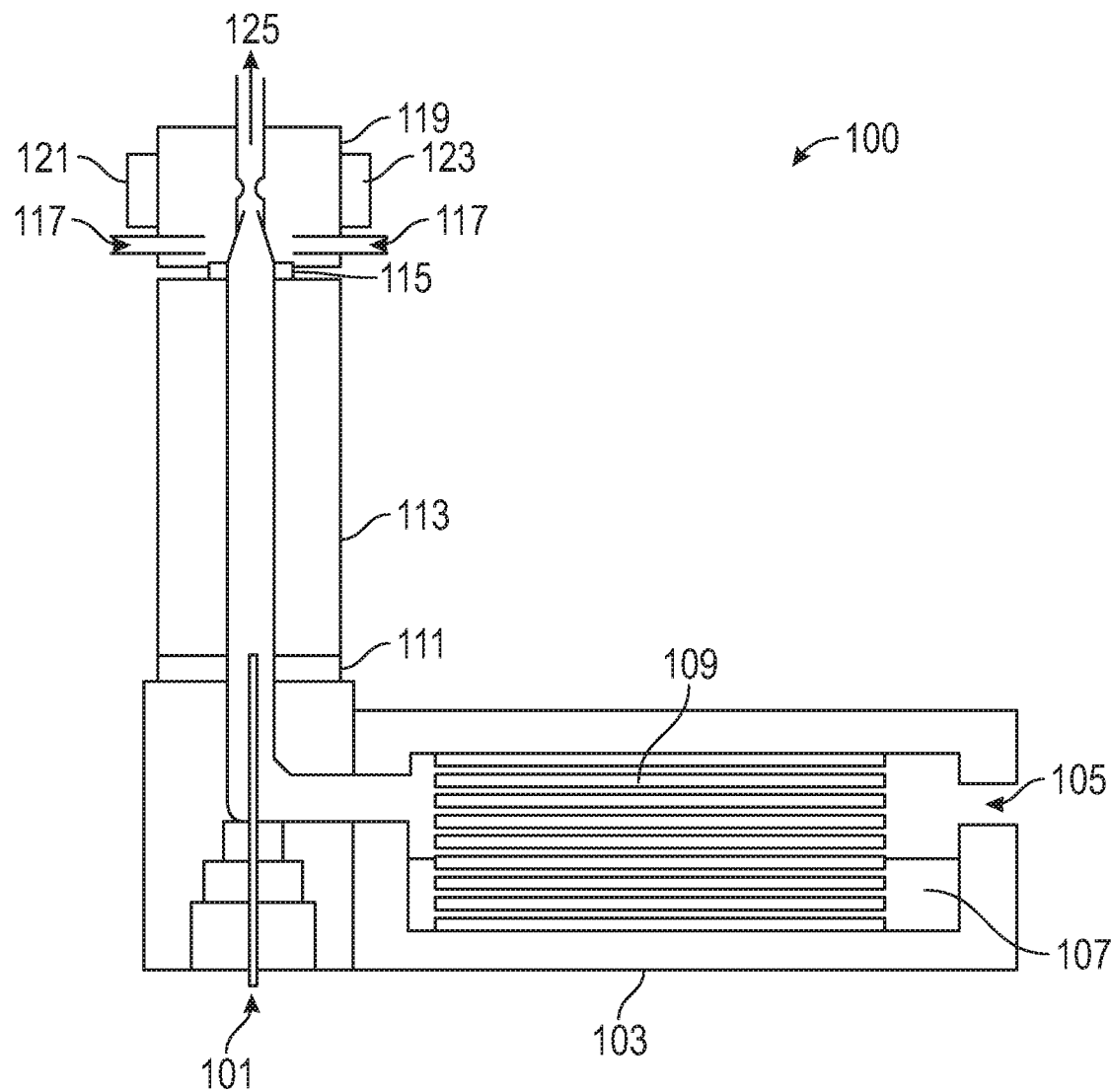
FIG. 1 shows a schematic diagram of a high-temperature condensation particle counter (HT-CPC) of the prior art.

The various embodiments of the high-temperature condensation particle counter (HT-CPC) disclosed herein show superior performance over contemporaneous reported designs, such as the HT-CPC 100 of the prior art as shown and described with reference to FIG. 1. As disclosed herein, the particle-counting statistics of the disclosed embodiments of the HT-CPC are greatly improved over prior art systems. For example, the sample flows of the disclosed subject matter are about eight times higher than those systems reported previously in the literature. Additionally, the makeup flow and concentric-tube design, discussed in more detail below, keep the optical elements cool, minimize particle losses to the nozzle, and prevent or reduce volatile contents from re-nucleating in the flow path and optics block. The operating temperatures of the disclosed subject matter are also lower than the reported, prior art designs and keep the temperatures well below the working-fluid flashpoint of 243° C. (in one exemplary embodiment). Consequently, the lower operating temperatures are advantageous in maintaining better working-fluid stability and a safer instrument by keeping the operating temperatures well below flash points of the various working-fluids. Further, a working fluid that is chemically more stable allows various ones of the disclosed embodiments of the HT-CPC also to use air as the carrier gas without having working fluid oxidation and degradation issues, thereby significantly simplifying instrument design and reducing the operating cost.

In the following detailed description, reference is made to the accompanying drawings that form a part of the high-temperature CPC and in which is shown, by way of illustration, specific embodiments. Other embodiments may be utilized and, for example, various thermodynamic, electrical, or physical changes may be made without departing from the scope of the present disclosure. The following detailed description is, therefore, is to be taken in an illustrative sense rather than in a limiting sense.

In general, a condensation particle counter (also known as a condensation nucleus counter) is used to detect particles in a monitored environment where the particles are too small to scatter enough light to be detected by conventional detection techniques (e.g., light scattering of a laser beam in an optical particle counter). The small particles are grown to a larger size by condensation formed on the particle. That is, each particle serves as a nucleation point for the working fluid. A vapor, which is produced by the working fluid of the particle detection instrument, is condensed onto the particles to make them larger. After achieving growth of the particle due to condensation of the working fluid vapor onto the particle, CPCs then function similarly to optical particle counters in that the individual droplets subsequently pass through the focal point (or line) of a laser beam, producing a flash of light in the form of scattered light. Each light flash is counted as one particle. The science of condensation particle counters, and the complexity of the instrumentation, lies with the technique to condense vapor onto the particles. When the vapor surrounding the particles reaches a specific degree of supersaturation, the vapor begins to condense on the particles. The magnitude of supersaturation determines a minimum-detectable particle size of the CPC. Generally, the supersaturation profile within the instrument is tightly controlled.

Figure 2A:
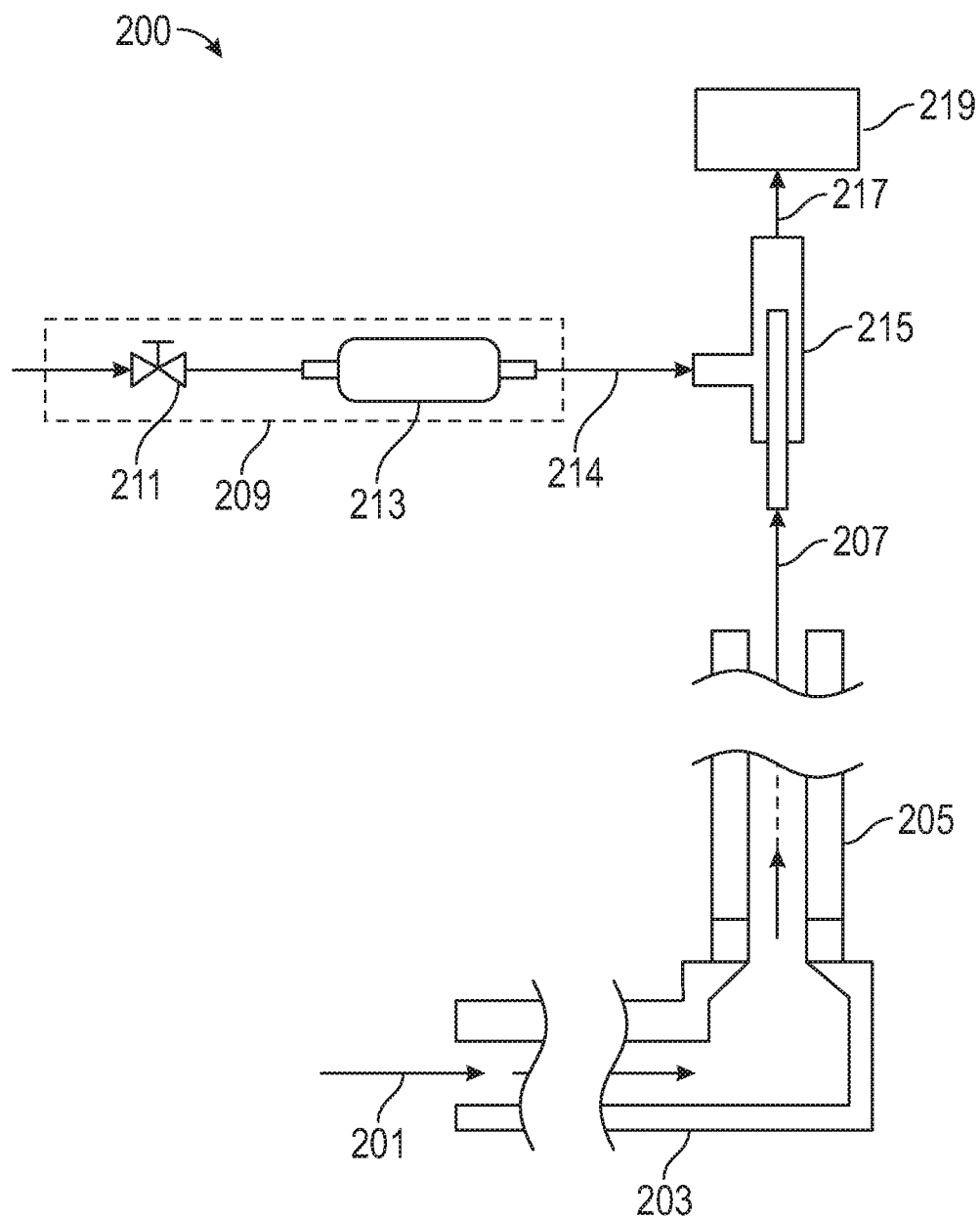
FIG. 2A shows a schematic diagram of an exemplary embodiment of an HT-CPC in accordance with various embodiments disclosed herein.

With reference now to FIG. 2A, a schematic diagram of an exemplary embodiment of an HT-CPC 200 in accordance with various embodiments disclosed herein is shown. The HT-CPC 200 is shown to include a saturator block 203, a condenser block 205, a makeup-flow block 215, and an optics block 219. In a specific exemplary embodiment, the optics block 219 comprises an optics block from a TSI® Model 3772 CPC having a slightly modified detector board. The modified detector board is configured to adjust the particle-counting threshold. However, in general, the optics block 219 incorporates an illumination source (e.g., a laser) and detection optics similar to or the same as other CPCs described above.

The HT-CPC 200 of FIG. 2A comprises of two flow streams: a sample flow and a makeup flow. Unlike the prior at HT-CPC 100 discussed above with reference to FIG. 1, which incorporates a TSI® Model 3025 CPC-like capillary flow design, the HT-CPC 200 includes an inlet to allow a sampled particle-laden gas flow 201 to be introduced directly into the saturator block 203. This design has several advantages over the prior art including a higher sample-flow rate (producing a better statistical sample in less time), a simplified mechanical design, and more accurate and robust flow control and measurement. For example, a sample flow rate of the HT-CPC 200 flow rate is about eight-times greater, or more, than devices of the prior art. As a result of the higher sample-flow rate, the HT-CPC 200 counting statistics are significantly better than prior art devices.

Further, during operation of the HT-CPC 200, hot gas coming from a flow stream 207 from the condenser block 205 (operating substantially above ambient temperature as noted below) is merged with a substantially particle-free output gas 214 (at approximately ambient room temperature of, for example, about 20° C.) providing a makeup gas-flow prior to entering the makeup-flow block 215 and subsequently entering the optics block 219. The makeup gas-flow serves at least three purposes: (1) keeping the optics block 219 cool (e.g., to approximately ambient room temperature); (2) diluting any excess working fluid vapors and condensable vapors from the flow stream 207 to reduce or minimize the vapors from re-nucleating within the flow path and in the optics block 219; and (3) supplementing the sampled particle-laden gas flow 201 to keep the optics flow at about, for example, 1 lpm. The concentric design of the makeup-flow block 215 keeps particles from the sampled particle-laden gas flow 201 confined close to a centerline of the flow path as the sampled particle-laden gas flow 201 is surrounded by gas from the particle-free output gas 214. Consequently, particle losses to nozzles are reduces or minimized in the gas flow 217 entering the optics block 219.

The sampled particle-laden gas flow 201 enters the saturator block 203, continues through the condenser block 205, and subsequently enters the makeup-flow block 215 from the flow stream 207. The makeup-flow block 215 in this embodiment is an open-loop design. A makeup-flow apparatus 209 includes a valve 211, to control a volumetric flow or mass flow of gas, and a filter 213, to substantially remove any particles from the gas. The filter 213 may comprise various types of particulate-air filter known in the art, such as a high-efficiency particulate air (HEPA) filter or ultra-low particulate air (ULPA) filter. The valve 211 may comprise a number of gas-flow control devices known in the art such as a needle valve, a mass-flow controller, a critical orifice, or other type of device. An input to the valve 211 may comprise clean, dry air (CDA), nitrogen, or any another gas to provide a substantially particle-free output gas 214 to the makeup-flow block 215.

Except for volumetric flowrates, operating temperatures, and working fluids, as described in more detail below, the saturator block 203 and the condenser block 205 function similarly to other types of CPCs described above. An example of a prototype of the HT-CPC 200 was constructed using portions of hardware from a TSI® Model 3777 CPC. To accommodate the high temperatures encountered by the HT-CPC, O-rings of the Model 3777 were replaced with Kalrez® O-rings (available from E. I. DuPont De Nemours and Co., 1007 Market Street, Wilmington, Del. 19898, USA) and Delrin® insulators from the Model 3777 CPC (also available from E. I. DuPont De Nemours and Co.) were replaced with Macoe-machinable-ceramic pieces (Macor® is available from Corning Glass Works, Houghton Park, Corning, N.Y. 14830, USA) or other high-temperature insulators.

Unlike conventional CPCs, which typically use thermoelectric devices (TEDs) to control condenser temperatures, various ones of the disclosed embodiments of a temperature of the condenser block 205 of the HT-CPC 200 are regulated with, for example, two mica heaters. The saturator block 203 also has two mica heaters (although a person of ordinary skill in the art, upon reading and understanding the disclosure provided herein, will recognize that a larger or smaller number, or other types of heater, may be substituted as well). In this exemplary embodiment, all four heaters are controlled and monitored by standalone proportional-integral-derivative (PID) controllers. Various saturator and condenser temperatures were evaluated and the temperatures of the saturator block 203 and the condenser block 205 were eventually set, in this exemplary embodiment of the HT-CPC 200, to 235° C. and 160° C., respectively.

Several workings fluids were evaluated for use in the HT-CPC 200. In a specific exemplary embodiment, Dow Corning 705 (DC 705), a type of diffusion-pump oil, performed for the example conditions disclosed herein. Dow Corning® 705 is a silicone pump-fluid and includes pentaphenyl trimethyl trisiloxane. For one embodiment of the HT-CPC 200, a piece of fiberglass insulation was cut and used as a wick. Approximate exemplary operating parameters of the HT-CPC 200 and the HT-CPC 100 of the prior art are summarized in Table I, below. Note that the temperatures for the HT-CPC 200 are lower and well below the working-fluid flash-point of 243° C. The lower operating temperature may be advantageous to an increased stability of the working fluid as well as a safer instrument. Moreover, a working fluid that is chemically more stable allows various ones of the disclosed embodiments of the HT-CPC to use air as the carrier gas without having oxidation and degradation issues of the working fluid, thereby significantly simplifying instrument design and reducing operating costs.

TABLE I

Operating Parameters

| | HT-CPC 200 | HT-CPC 100 (prior art) |
|---|---|---|
| Sample Flow | 0.165 lpm | 0.02 lpm |
| Condenser Flow | 0.165 lpm | 0.275 lpm |
| Optics Flow | 1 lpm | 1 lpm |
| Saturator Temperature | 235° C. | 290° C. |
| Condenser Temperature | 160° C. | 250° C. |
| Optics Temperature | ~24° C. (not controlled) | 45° C. |
| Working Fluid | DC 705 | DC 705 |
| Carrier Gas | Air | Nitrogen |

Figure 2B:
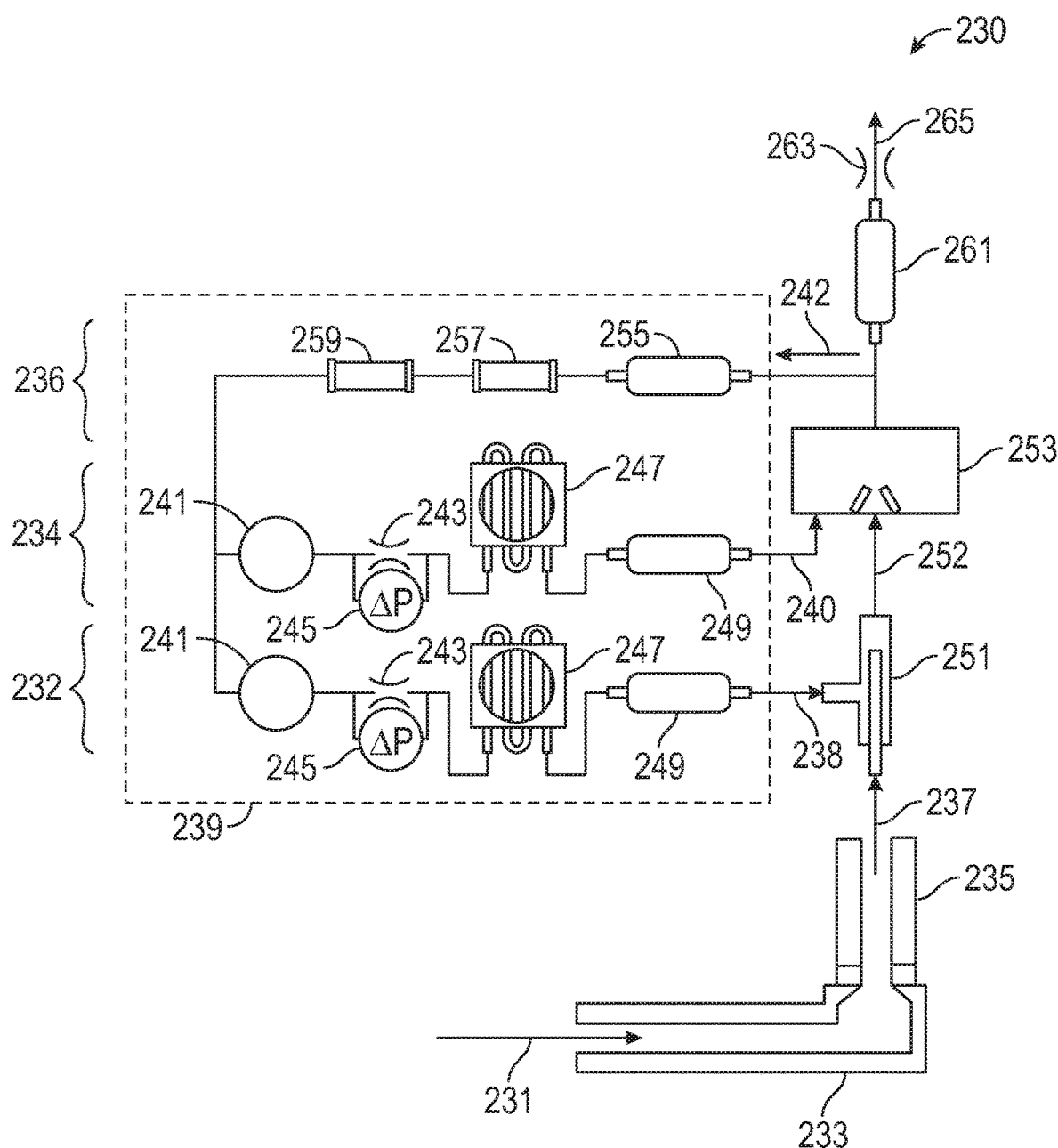
FIG. 2B shows a schematic diagram of an exemplary embodiment using a closed-loop design for flow control of the HT-CPC and having two pumps, in accordance with various embodiments disclosed herein.

Referring now to FIG. 2B, a schematic diagram of an exemplary embodiment using a closed-loop design for flow control of an HT-CPC 230 and having gas pumps 241, in accordance with various embodiments disclosed herein, is shown. The HT-CPC 230 is shown to include a saturator block 233, a condenser block 235, a makeup-flow block 251, a closed-loop particle-free gas supply 239, an optics block 253, a downstream filter 261, and a downstream critical-orifice 263. The saturator block 233 and the condenser block 235 may the same as or similar to the saturator block 203 and the condenser block 205 of FIG. 2A. However, the saturator block 233 and the condenser block 235 of FIG. 2B may be configured to operate at temperatures dissimilar to those of the saturator block 203 and the condenser block 205 of FIG. 2A. Also, the optics block 253 may the same as or similar to the optics block 219 of FIG. 2A. However, the optics block 253 of the HT-CPC 230 also incorporates a curtain flow design, using a clean, curtain-flow gas 240 from the closed-loop particle-free gas supply 239. Embodiments of a curtain-flow design are described in more detail with reference to FIGS. 2D and 2E, below.

In an embodiment, the closed-loop particle-free gas supply 239 includes three sections: a makeup gas-supply section 232, a curtain-flow gas-supply section 234, and a recirculation gas-supply section 236. As described in more detail below, the gases within these sections use at least a portion of an outlet flow-stream 242 from the optics block 253 to provide an input feed gas to the makeup gas-supply section 232 and the curtain-flow gas-supply section 234. The makeup gas-supply section 232 and the curtain-flow gas-supply section 234 provide substantially particle-free output gas 236 and curtain-flow gas 240.

The makeup gas-supply section 232 includes a gas pump 241, an orifice 243 to control a volumetric flow of the gas from the pump, a pressure gauge 245 to monitor a pressure drop across the orifice 243 to facilitate flow control, a heat exchanger 247, and a filter 249. The gas pumps 241 may comprise one of a variety of gas pumps known in the art such as carbon-vane pumps and other rotary pumps, reciprocating pumps, peristaltic pumps, and a variety of other gas-pump types. As is known in the art, a differential-pressure flow-control device (e.g., a critical orifice) provides a substantially constant flowrate of a gas under varying load conditions. With a more capable gas pump, a constant flowrate can also be achieved with choked flow by using a smaller opening orifice. In this case, the orifice 243 is referred to as critical orifice and the pressure gauge 245 is optional. In order for the choked flow to function properly, a minimum pressure drop, ΔP, is maintained across the critical orifice 243 to provide the substantially constant flowrate. Depending on other conditions, the pressure drop in typically maintained in excess of 350 mm Hg (approximately 14 inches of Hg). The optional pressure gauge 245 allows for monitoring the pressure drop to maintain the substantially constant flowrate. In this embodiment, the heat exchanger 247 removes heat from the gas to a desired temperature (e.g., approximately ambient room temperature of approximately 20° C.). In embodiments, the heat exchanger 247 can also be used to add heat to the gas. The filter 249 may be the same as or similar to the filter 213 of FIG. 2A. The makeup gas-supply section 232 provides clean, filtered gas through the particle-free output gas 238 that is fed into the makeup-flow block 251, where the filtered gas is combined with an outlet flow-stream 237 from the condenser block 235, which includes both the sampled particle-laden gas flow 231 and vapors from working fluid with the saturator block 233, some of which have nucleated onto particles from the sampled particle-laden gas flow 231. An outlet flow-stream 252 includes combined flow-streams from the outlet flow-stream 237 and the particle-free output gas 238.

The curtain-flow gas-supply section 234 also includes a gas pump 241, an orifice 243 to control a volumetric flow of the gas from the pump, a pressure gauge 245 to monitor a pressure drop across the orifice 243 to facilitate flow control, a heat exchanger 247, and a filter 249. Each of these components within the curtain-flow gas-supply section 234 may be the same as or similar to the related components of the makeup gas-supply section 232. The curtain-flow gas-supply section 234 provides clean, filtered gas through the curtain-flow gas 240 that is fed into the optics block 253 to prevent or reduce an amount of particulate matter and vapor contamination on optical elements within the optics block 253. As noted above, embodiments of a curtain-flow design are described in more detail with reference to FIGS. 2D and 2E, below.

The recirculation gas-supply section 236 uses at least a portion of the outlet flow-stream 242 from the optics block 253 to provide an input feed gas to the makeup gas-supply section 232 and the curtain-flow gas-supply section 234. The recirculation gas-supply section 236 includes a primary filter 255, a secondary filter 257, and a gas dryer 259. The primary filter 255 may be the same as or similar to the filter 213 of FIG. 2A. The secondary filter 257 may comprise, for example, a charcoal filter. A charcoal filter is known to adsorb certain types of molecules such as hydrocarbons and other molecules that may be present within the sampled particle-laden gas flow 231 as well as vapors from the working fluid within the saturator block 233. The gas dryer 259 may comprise, for example, a silica dryer to adsorb at least a portion of moisture (e.g., working fluid vapor) from the outlet flow-stream 242. The gas dryer 259 may also comprise one or more other types of chemical or mechanical dryers (e.g., a compressed-gas dryer) as well.

The downstream filter 261 removes most particles from a remaining portion of an outlet flow-stream from the optics block 253 that are not sent to the recirculation gas-supply section 236. The downstream critical-orifice 263 limits an amount of the outlet flow-stream from the optics block 253 that is released as a clean flow-stream 265 to the environment.

Approximate exemplary operating parameters of the HT-CPC 230 are summarized in Table II, below. Note that the temperatures for the HT-CPC 230 are lower and well below the working-fluid flash-point of 243° C. for the Dow Corning® 705 diffusion-pump oil used in this exemplary embodiment. The lower operating temperature may be advantageous to an increased stability of the working fluid as well as a safer instrument. A working fluid that is chemically more stable allows the HT-CPC 230 to use air as the carrier gas without having oxidation and degradation issues of the working fluid, thereby significantly simplifying instrument design and reducing operating costs.

TABLE II

Operating Parameters

| | HT-CPC 230 Operating Parameters |
|---|---|
| Sample Flow | 0.2 lpm |
| Condenser Flow | 0.2 lpm |
| Optics Flow | 2 lpm |
| Saturator Temperature | 230° C. |
| Condenser Temperature | 186° C. |
| Optics Temperature | ~24° C. (not controlled) |
| Working Fluid | DC 705 |
| Carrier Gas | Air |

Figure 2C:
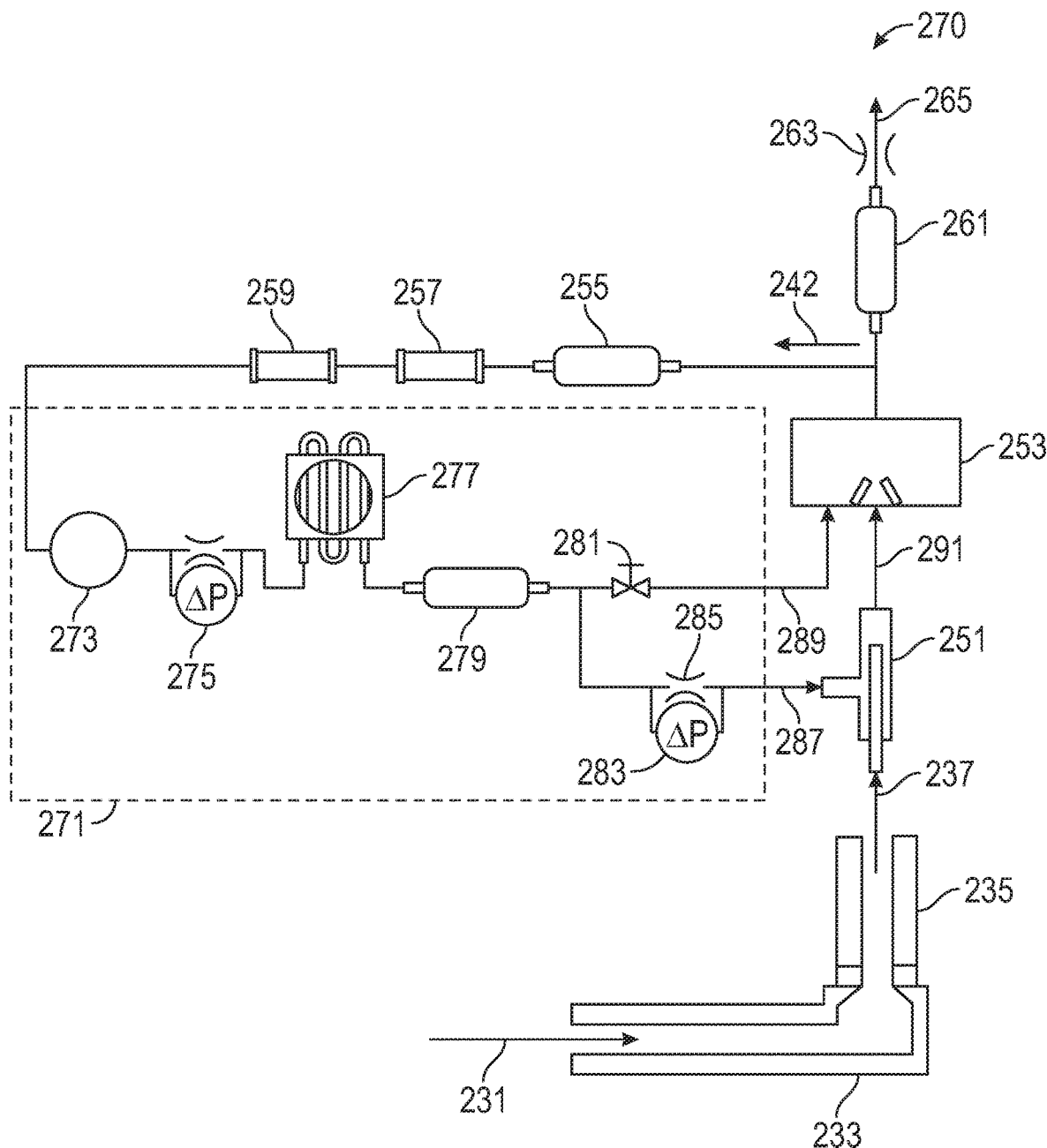
FIG. 2C shows a schematic diagram of an exemplary embodiment using a closed-loop design for flow control of the HT-CPC and having a single pump; in accordance with various embodiments disclosed herein.

Referring now to FIG. 2C, a schematic diagram of an exemplary embodiment using a closed-loop design for flow control of an HT-CPC 270 and having a single pump, in accordance with various embodiments disclosed herein is shown. The HT-CPC 270 is similar to the HT-CPC 230 of FIG. 2B. However, rather than having separate sections for the makeup gas-supply section 232 and the curtain-flow gas-supply section 234, the HT-CPC 270 uses a combined makeup and curtain-flow gas-supply section 271 having the pump 273, a combined orifice and pressure gauge combination 275, a heat exchanger 277, and a filter 279. Downstream of the filter 279, the gas-supply is split into a particle-free output gas 287 and a curtain-flow gas 289. The curtain-flow gas 289 is controlled by a valve 281 and a remaining portion of the gas from the filter 279 is controlled by a differential-pressure flow-control device that comprises an orifice 285 and a pressure gauge 283.

The particle-free output gas 287 provides clean, filtered gas through to the makeup-flow block 251, where the filtered gas is combined with the outlet flow-stream 237 from the condenser block 235, which includes both the sampled particle-laden gas flow 231 and vapors from working fluid with the saturator block 233, some of which have nucleated onto particles from the sampled particle-laden gas flow 231. An outlet flow-stream 291 from the makeup-flow block 251 includes combined flow-streams from the outlet flow-stream 237 and the particle-free output gas 287.

The pump 273, the combined orifice and pressure gauge combination 275, the heat exchanger 277, and the filter 279 may be the same as or similar to related components of FIG. 2B. The valve 281 may be the same as or similar to the valve 211 of FIG. 2A.

Figure 2D:
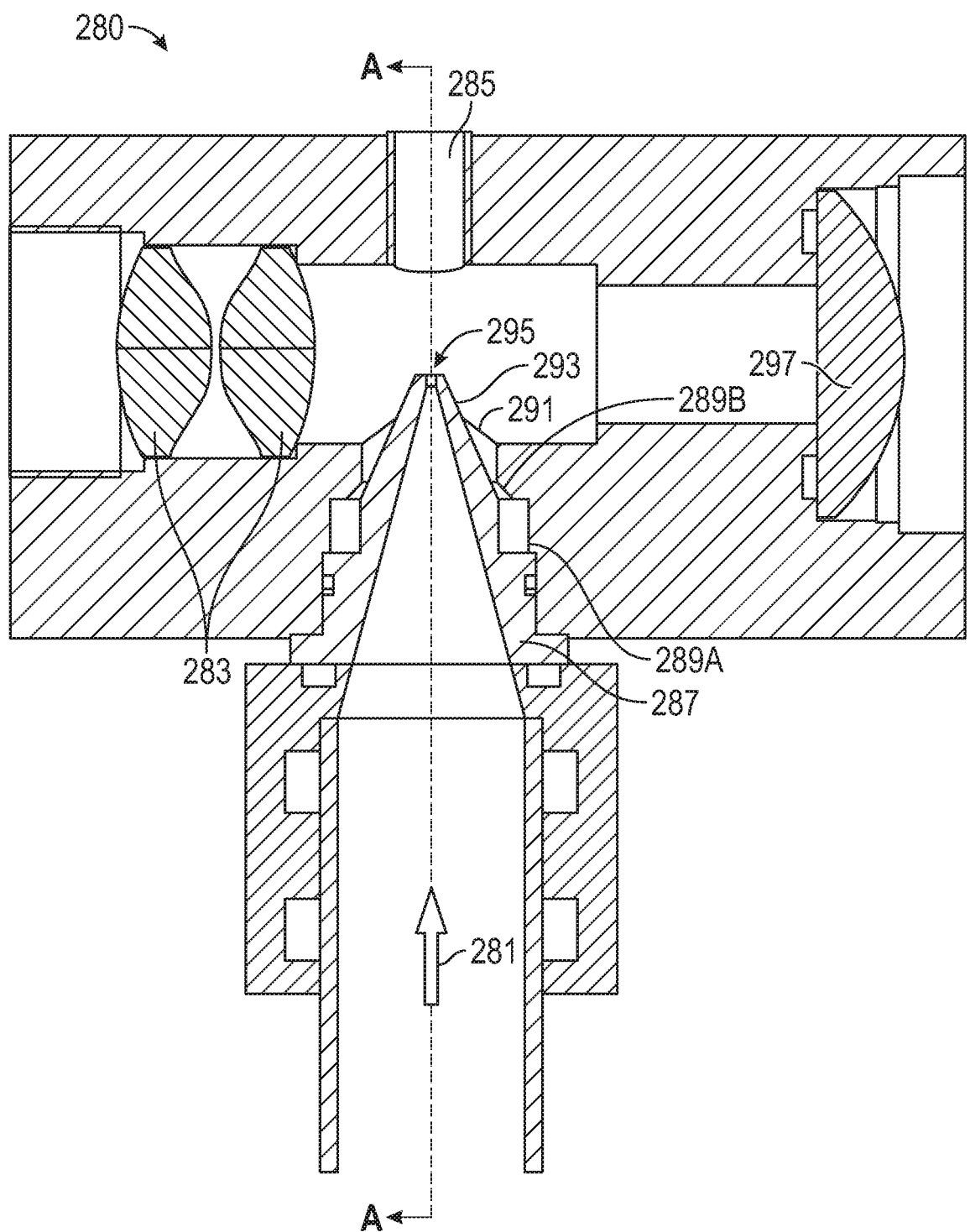
FIG. 2D shows a cross-sectional view of an optical chamber of a particle-counting instrument and an aerosol nozzle having a curtain-flow device in accordance with various embodiments of the disclosed subject matter.

With reference now to FIG. 2D, a cross-sectional view of an optical chamber 280 of a particle-counting instrument and an aerosol-focusing nozzle 287 having a curtain-flow device in accordance with various embodiments of the disclosed subject matter are shown. In addition to the optical chamber 280 and the aerosol-focusing nozzle 287, FIG. 2D is shown to include a pair of collection lenses 283, a condenser lens 297, an aerosol inlet port 281, and an aerosol outlet port 285. As is known to a person of ordinary skill in the art, the collection lenses 283 and the condenser lens 297 can take a variety of forms and shapes.

The aerosol-focusing nozzle 287 has an upper portion 293 and an aerosol nozzle outlet 295. In an embodiment, the curtain-flow device comprises a plenum chamber 289A and a curtain-flow concentrating nozzle 289B During a particle-counting operation, a combination of the plenum chamber 289A and the curtain-flow concentrating nozzle 289B provides a clean sheath of airflow, through an open area 291 and over the upper portion 293 of the aerosol-focusing nozzle 287.

The plenum chamber 289A and the curtain-flow concentrating nozzle 289B are formed substantially to be annular or partially annular around the upper portion 293 of the aerosol-focusing nozzle 287. The plenum chamber 289A and the curtain-flow concentrating nozzle 289B may therefore be considered to have a toroidal shape.

The plenum chamber 289A and the curtain-flow concentrating nozzle 289B may be formed from a variety of materials including machined or otherwise formed aluminum, stainless steel, various plastics, and other machinable or formable materials known in the art. In an embodiment, the plenum chamber 289A and the curtain-flow concentrating nozzle 289B may be machined or formed from a single piece of material. In another embodiment, the plenum chamber 289A and the curtain-flow concentrating nozzle 289B may be machined or formed from two materials, that are either similar or dissimilar to each other, and that are joined together (e.g., by chemical adhesives, soldering, welding, mechanical fasteners, or other techniques known to a person of ordinary skill in the art).

Figure 2E:
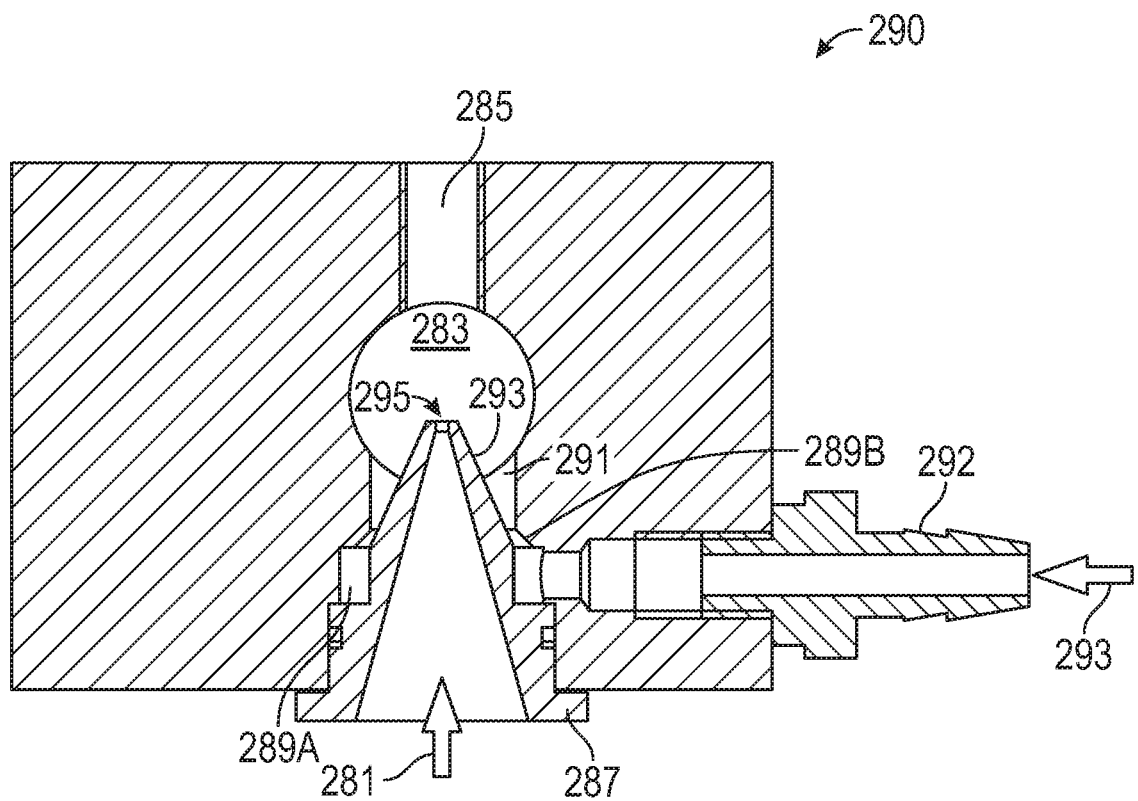
FIG. 2E shows a cross-sectional view of the optical chamber of the particle-counting instrument and the aerosol nozzle having a curtain-flow device at Section A-A of FIG. 2D.

FIG. 2E shows a cross-sectional view 290 of the optical chamber 280 of the particle-counting instrument and the aerosol nozzle having the curtain-flow device at Section A-A of FIG. 2D. A gas-line connector 292 allows gas-line tubing (not shown) to provide a clean (e.g., filtered), curtain gas to a gas-flow inlet 293 to the plenum chamber 289A. In a specific exemplary embodiment, the gas-line connector 292 is a barb connector (as shown). However, in other embodiments, the gas-line connector 292 may be any type of gas-line connector known in the art (e.g., a Swagelok® tube fitting, available from Swagelok Company, Solon, Ohio, USA). The gas-line tubing may comprise various types of tubing including nylon tubing, stainless-steel tubing, brass tubing, or other types of tubing known in the art. The clean gas introduced into the gas-flow inlet 293 may comprise air (e.g., clean-dry air (CDA)), an inert gas such as argon or hydrogen, or another type of filtered gas that is substantially particle free.

With concurrent reference to FIGS. 2D and 2E, during operation of the particle-counting instrument, a flow of curtain gas enters the optical chamber 280 through the gas-line connector 292. To ensure the curtain gas enters the optical chamber 280 substantially uniformly, the curtain gas is directed through the plenum chamber 289A and into the optical chamber 280 through, for example, a narrow opening (e.g., a slit or series of openings) on an uppermost portion of the curtain-flow concentrating nozzle 289B. The narrow opening may comprise, for example, a single continuous slit or a series or circular or elongated slits.

One function of the combination of the plenum chamber 289A and the curtain-flow concentrating nozzle 289B is substantially to equalize flow pressure so that the curtain flow (from the gas-flow inlet 293) can be distributed substantially evenly around the upper portion 293 of the aerosol-focusing nozzle 287 before passing from the narrow opening in the curtain-flow concentrating nozzle 289E into the open area 291 surrounding the upper portion 293, through the narrow opening.

To enhance flow uniformity further, the curtain flow can also be introduced tangentially (e.g., at an angle with reference to a circumferential direction of the plenum chamber 289A) into the plenum chamber 289A. When the curtain flow is introduced tangentially, a swirling movement of the flow fills up the plenum chamber 289A and curtain-flow concentrating nozzle 289B quickly. Once inside the optical chamber 280, the curtain flow then merges co-axially or nearly co-axially with the aerosol flow that exits from the aerosol nozzle outlet 295. Consequently, the aerosol flow is not disrupted and is substantially uniformly surrounded by the curtain flow. Therefore, all or nearly all of the potential contaminants (e.g., particles and vapors) are contained inside the aerosol flow. The combined aerosol flow and curtain flow then passes through the focused light-beam, described above, where particles are illuminated and counted before exiting from the aerosol outlet port 285.

A location of the aerosol outlet port 285 could be anywhere in the optical chamber 280 as long as it is located downstream of the focused light-beam. However, in one embodiment, the location of the aerosol outlet port 285 is opposite the aerosol-focusing nozzle 287, as shown in FIGS. 2D and 2E. This location provides the shortest distance between the aerosol-focusing nozzle 287 and the aerosol outlet port 285. When the aerosol outlet port 285 is opposite from the aerosol-focusing nozzle 287, a probability of contaminants traversing the curtain flow to reach the sensitive optical components is reduced or minimized. The straight flow path from the aerosol-focusing nozzle 287 to the aerosol outlet port 285 also avoids any change in flow direction, which potentially could introduce flow disturbances resulting in a higher probability of particles and/or working fluid vapors deviating from the flow path and contaminating the optical chamber 280, including the optical elements (e.g., one or more surfaces of the collection lenses 283 and/or the condenser lens 297).

In addition to reducing or minimizing contamination within the optical chamber 280, the curtain flow also provides an added benefit of reducing particle impaction losses to the walls of the optical chamber 280. With the curtain flow, particles are restricted substantially to a middle-portion of the combined aerosol flow and curtain flow. For example, in a CPC instrument, a common issue occurs when warm working-fluid vapors condense on cooler tubing walls resulting in a "foggy" tubing scenario. If excess condensates are formed, CPC flow rates may be affected, thereby resulting in higher measurement uncertainties. The curtain flow design of the disclosed subject matter helps to reduce, minimize, or prevent the foggy tubing issue as the curtain flow allows warm vapors to continue to cool down in the middle-portion of the flow, while separating warm working-fluid vapors from cool tubing walls.

The co-axial or nearly co-axial curtain flow design of the disclosed subject matter has many advantages over an orthogonally filtered air-flow design of the prior art. For example, the co-axial or nearly co-axial curtain flow merges smoothly with the aerosol flow as both flow in the same direction. In comparison, the orthogonally filtered air-flow needs to turn 90 degrees before merging with the aerosol flow. The 90-degree turn in flow direction is likely to generate flow turbulence, which could reduce the effectiveness of the curtain flow. Additionally, to reduce or minimize contamination of the optical chamber 280, the particle-laden or vapor-laden aerosol flow can be surrounded substantially fully and uniformly by the curtain flow.

Counting Efficiency, Linearity, and Volatile-Particle Testing of the Various Embodiments of the HT-CPC For the counting-efficiency test to comply with the EU PMP requirements described above, various embodiments of the HT-CPC units were evaluated with differential-mobility-analyzer (DMA)-classified monodisperse, furnace-generated sodium chloride (NaCl) particles. The calibration reference was a TSL® Model 3068B Aerosol Electrometer. Sample flows from the aerosol electrometer were maintained at 1 lpm. For the linearity testing, DMA-classified 40 nm, atomizer-generated NaCl particles were used. Various concentration levels of the particles were achieved using a dilution bridge. For the volatile-particle test, the various embodiments of the HT-CPC units were challenged with tetracontane. Tetracontane is specified by the PMP and is an isomer of the aliphatic-hydrocarbon family having forty carbon atoms and a chemical formula of $C_{40}H_{82}$.

Figure 3:
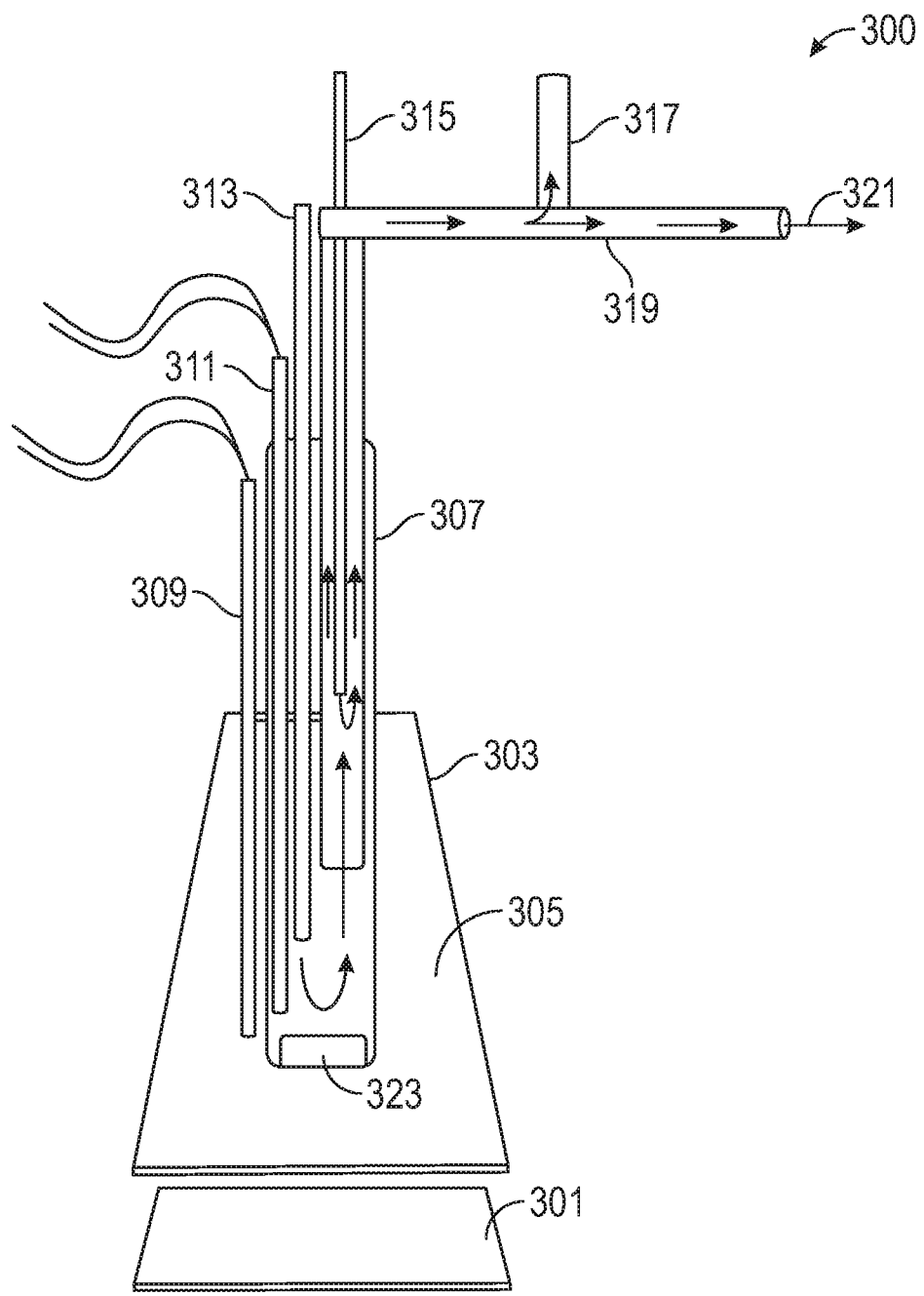
FIG. 3 shows a schematic diagram of a tetracontane particle-generator used to challenge various embodiments of the disclosed HT-CPC units for a volatile-particle test.

FIG. 3 shows a schematic diagram of a tetracontane particle-generator 300 used to challenge various embodiments of the disclosed HT-CPC units for the volatile-particle test. The tetracontane particle-generator 300 is shown to include a heating element 301 (e.g., an electric Bunsen), a flask 303 containing an oil 305 (e.g., corn oil) and a tetracontane block 323, a rubber-stopped test tube 307, an oil bath thermocouple 309, a carrier-gas/tetracontane-vapor thermocouple 311, and a carrier-gas inlet tube 313. In operation, the heating element 301 heats the oil 305 in the flask 303, which in turn heats the tetracontane block 323. A carrier gas (e.g., nitrogen or air) is introduced into the carrier-gas inlet tube 313. Vapors of tetracontane are carried into the rubber-stopped test tube 307 and are cooled by a cooled quench gas introduced into a quench-gas inlet tube 315. Because of the quenching effect, tetracontane particles are formed by homogeneous nucleation. The now-cooled tetracontane-aerosol flow continue to an outlet tube 319 to produce a tetracontane-aerosol output 321. Excess amounts of the tetracontane aerosol flow not needed for the volatile-particle testing may be directed to a vent 317.

Referring back now to the use of DMA-classified particles, FIG. 4A shows a counting-efficiency graph 400 of various embodiments of the HT-CPC disclosed herein; the graph 400 indicates counting efficiency as a function of particle diameter using sodium-chloride (NaCl) particles to test various embodiments of the HT-CPC. The graph 400 indicates a $D_{50}$ cut-point of approximately 5 nm for the sample HT-CPC unit tested on different days (as indicated by "SAMPLE 1" and "SAMPLE 2"). As further indicated by the graph 400, results from the two different days are in good agreement with each other showing that the performance of the HT-CPC unit is consistent over time. The counting efficiencies for large particles (e.g., greater than about 20 nm) are at about 93%. Additional optimization of the various embodiments of the HT-CPC units has improved counting efficiencies to approximately 100%. At least a portion of the optimization has been occurred by compensating for diffusion losses.

Figure 4B:
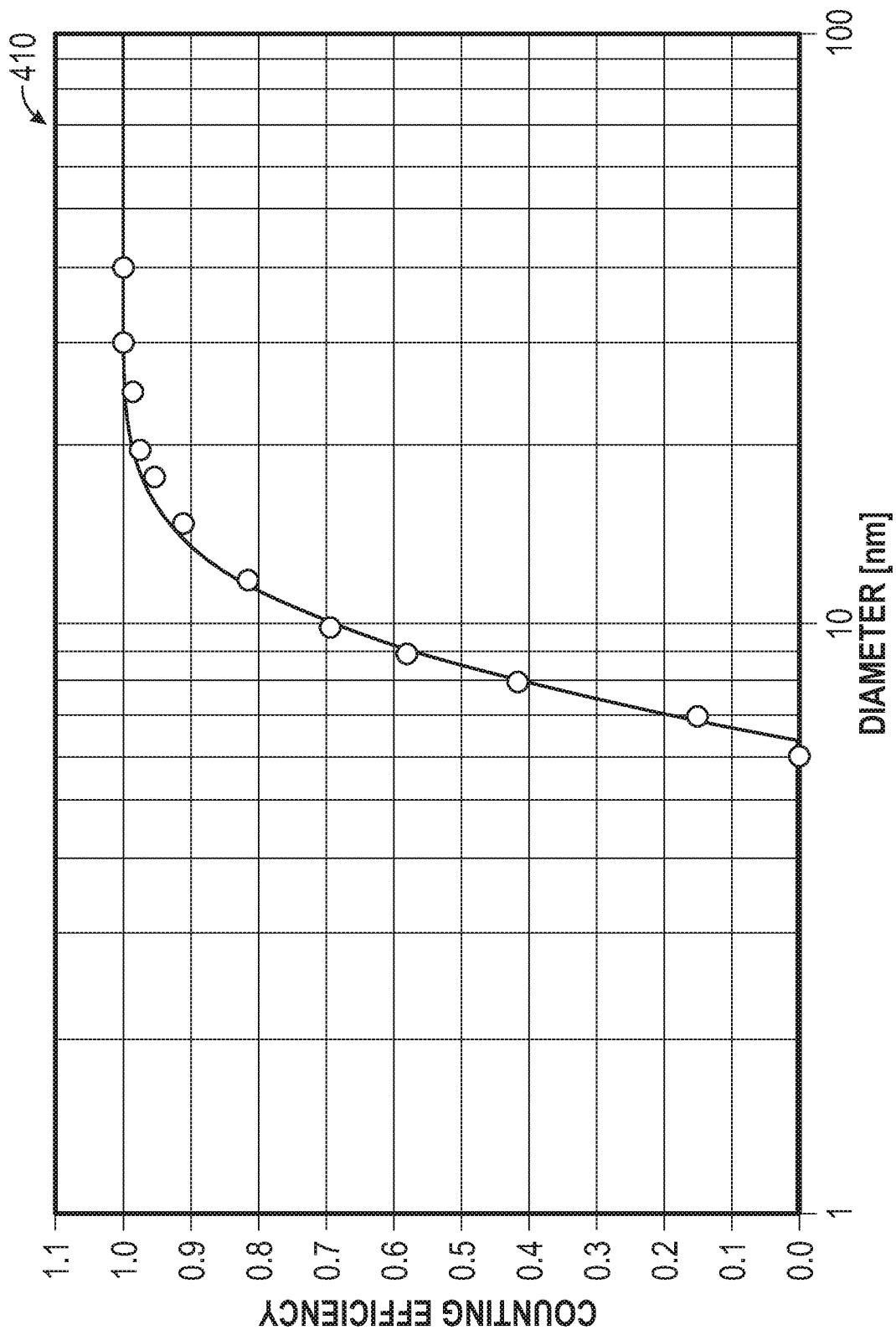
FIG. 4B shows a graph of particle-counting efficiency as a function of particle diameter using sodium chloride particles, classified by a differential-mobility analyzer (DMA), to challenge various embodiments of the disclosed HT-CPC; which meets the proposed PMP 10 nm cut point CPC requirement.

FIG. 4B shows a graph 410 of particle-counting efficiency as a function of particle diameter using DMA classified sodium chloride particles to challenge various embodiments of the disclosed HT-CPC. The particle-counting efficiency as a function of particle diameter was constructed based on a sampled NaCl gas-flow of 0.2 lpm with a total flow into the optics block at 2 lpm. A temperature of the saturator block was 230° C. and a temperature of the condenser block was 186° C. The counting efficiency at 10 nm is about 69% and consequently readily meets the newly-proposed PMP 10 nm, CPC cut point requirement which stating that the counting efficiency at 10 nm needs to be within a range of 50% to 70%.

Figure 4C:
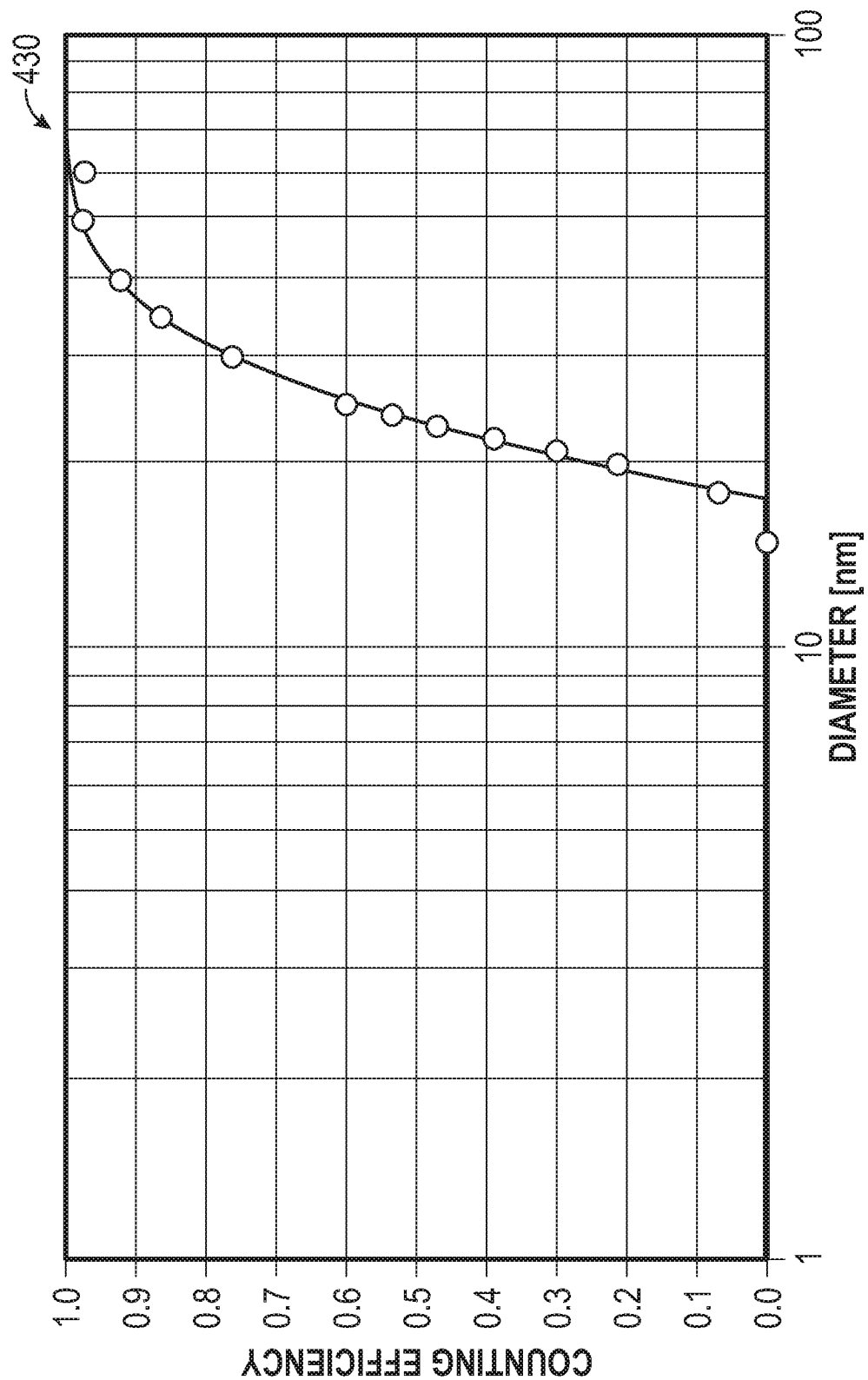
FIG. 4C shows a graph of particle-counting efficiency as a function of particle diameter using DMA-classified sodium chloride particles to challenge various embodiments of the disclosed HT-CPC, which meets the PMP 23 nm cut point CPC requirement.

FIG. 4C shows a graph 430 of particle-counting efficiency as a function of particle diameter using DMA classified sodium chloride particles to challenge various embodiments of the disclosed. HT-CPC. The particle-counting efficiency as a function of particle diameter was constructed based on a sampled NaCl gas-flow of 0.2 lpm with a total flow into the optics block at 2 lpm. A temperature of the saturator block was about 200° C. and a temperature of the condenser block was about 180° C. The stated operational parameters allow various embodiments of the disclosed HT-CPC to meet PMP current 23 nm, CPC cut point requirement.

Figure 5:
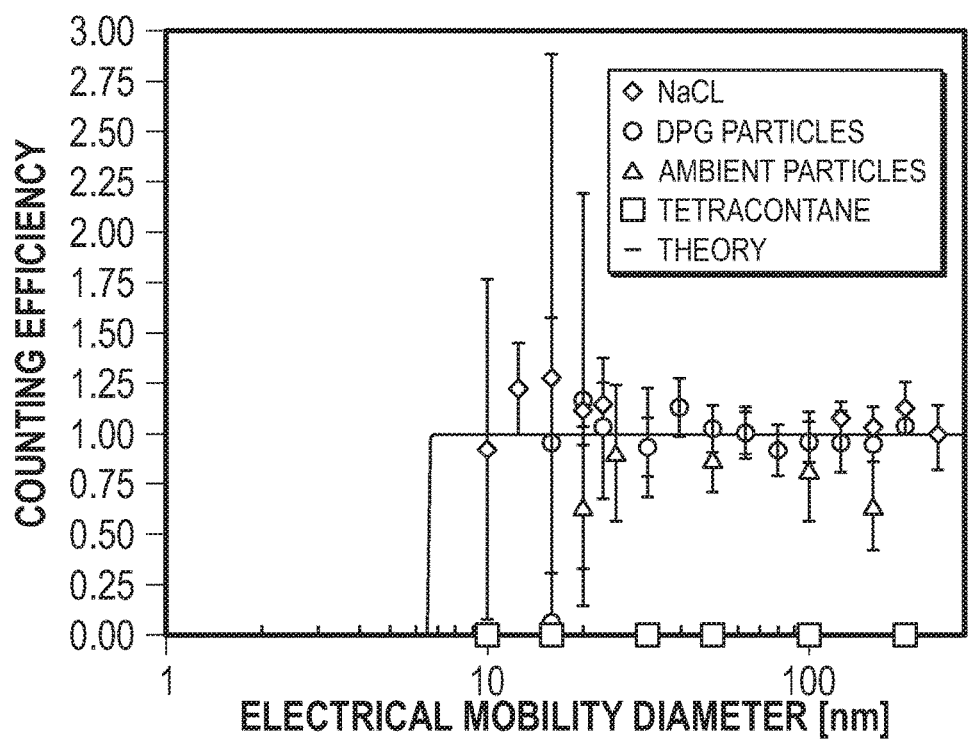
FIG. 5 shows a counting-efficiency graph of the prior art HT-CPC discussed above with reference to FIG. 1 for a variety of different particle types.

In comparison with the counting efficiencies of the various embodiments of the disclosed HT-CPC, FIG. 5 shows a counting-efficiency graph of the HT-CPC 100 of the prior art, discussed above with reference to FIG. 1, for a variety of different particle types. The particle types include NaCl particles, dispersed particle gel (DPG) particles, ambient particles, tetracontane particles, and theoretical counting-efficiency for the HT-CPC 100. As is known to a person of ordinary skill in the art, the DPG is a three-phase foam in which DPG particles comprise polymer particles with viscoelasticity having characteristics of solid particle. Notice the large error bars in the prior art data of FIG. 5. The large error bars are likely due to uncertainties caused by the small sample flow rate of the HT-CPC 100 of the prior art, which is about 1/8 or less than the flow rate of the disclosed HT-CPC units.

Figure 6A:
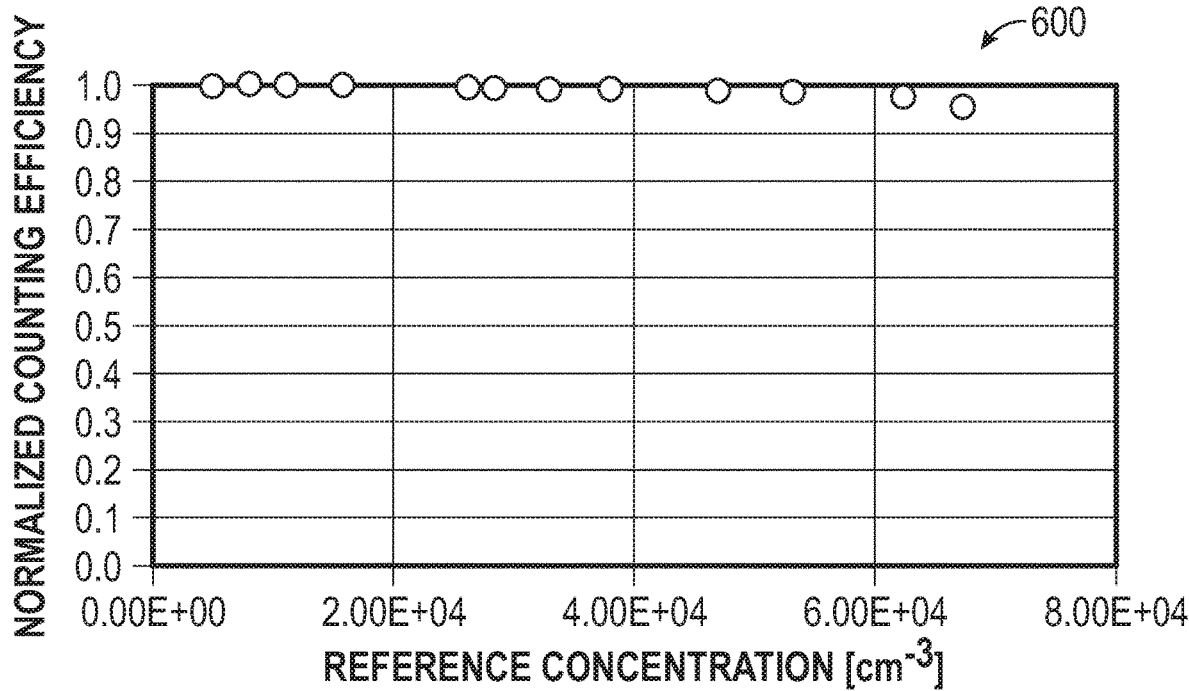
FIG. 6A shows a linearity graph of various embodiments of the HT-CPC disclosed herein, the graph indicates normalized counting-efficiency as a function of reference particle concentration.

FIG. 6A shows a linearity graph 600 of various embodiments of the HT-CPC disclosed herein; the graph 600 indicates normalized counting-efficiency as a function of reference particle concentration. As indicated, the normalized counting-efficiency drops by about 4% at 67 K counts/cm$^3$. The decrease in concentration is mainly because some of the pulses in this test dropped below the counting threshold. Therefore, the concentration limit can be adjusted to be higher once the low pulse-height threshold is decreased (as discussed in more detail, below).

Figure 6B:
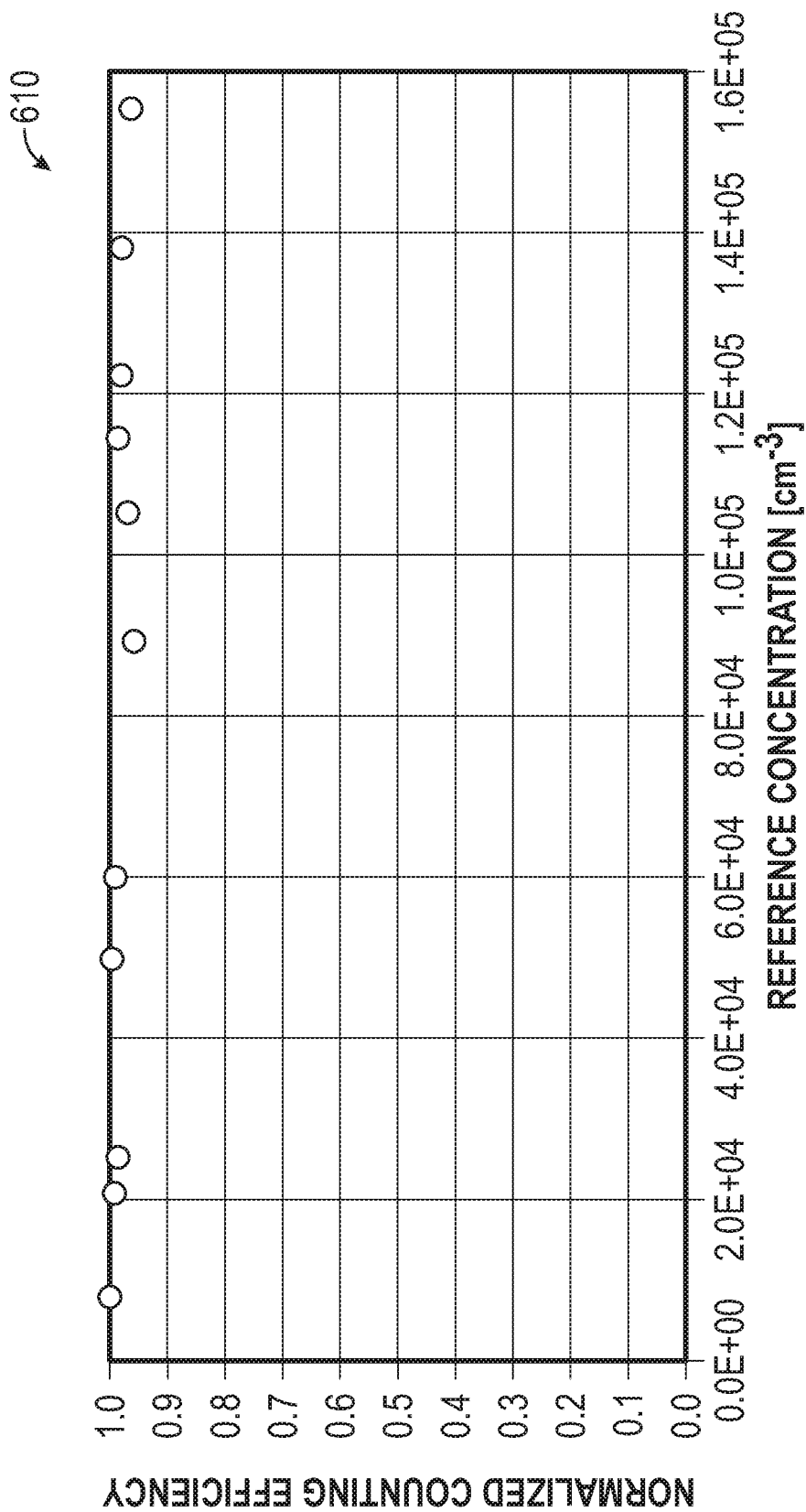
FIG. 6B shows another linearity graph of various embodiments of the HT-CPC disclosed herein, the graph indicates normalized counting-efficiency as a function of reference particle concentration, the range of concentration being greater than the concentration range of FIG. 6A.
Figure 7A:
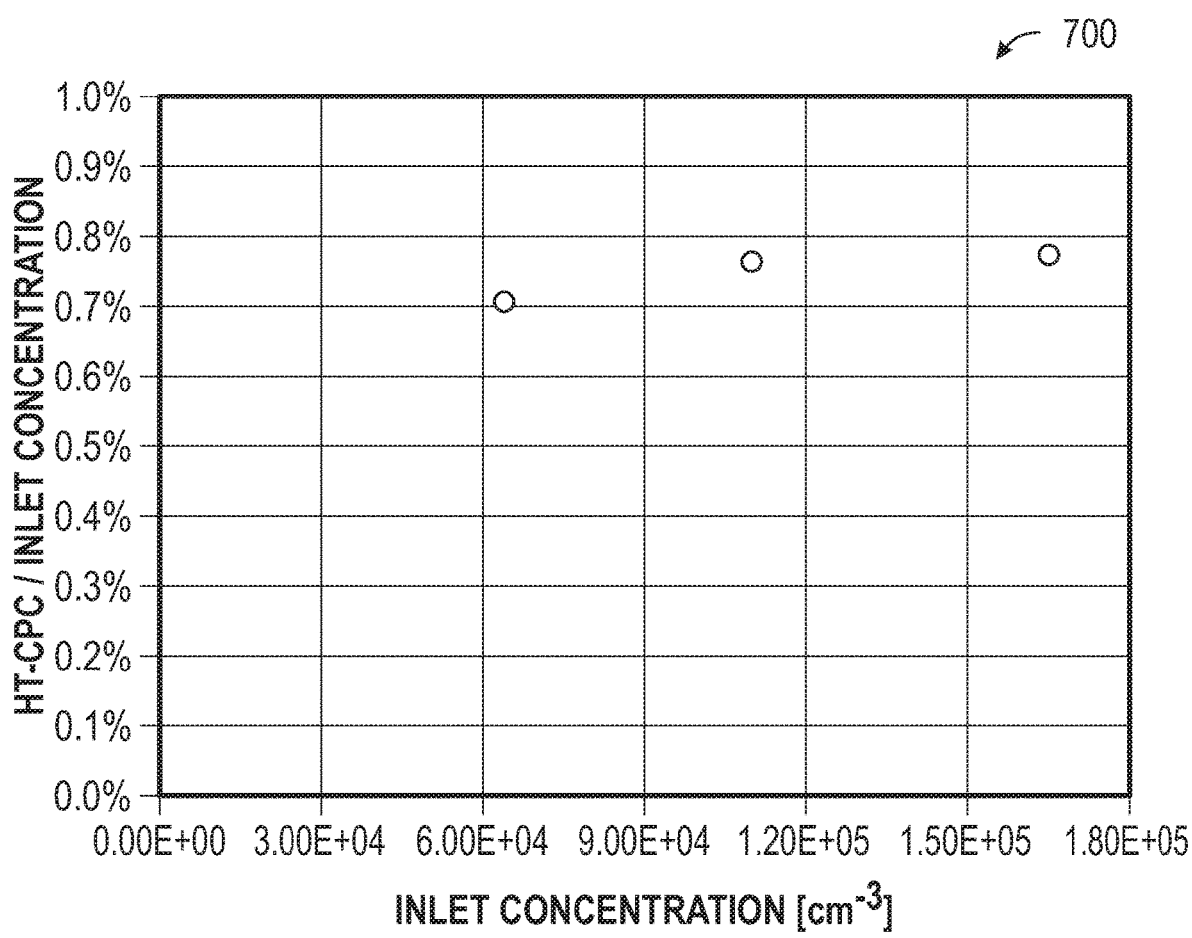
FIG. 7A shows a volatile-particle-test graph for tetracontane particles displayed as an HT-CPC inlet concentration percentage as a function of aerial concentration (in units of particles per $cm^3$)

FIG. 6B shows another linearity graph 610 of various embodiments of the HT-CPC disclosed herein; the graph 610 indicates normalized counting-efficiency as a function of reference particle concentration, the range of concentration being greater (by approximately twice the concentration) than the concentration range of FIG. 6A Referring now to FIG. 7A, a volatile-particle-test graph 700 for tetracontane particles displayed as an HT-CPC inlet concentration percentage as a function of aerial concentration (in units of particles per cm$^3$) is shown. Since the tetracontane particle-size distributions from the tetracontane particle-generator 300 of FIG. 3 were fairly narrow, the tetracontane particles were used in the volatile-particle test without DMA classification. The number of particles detected by the HT-CPC appeared to be a function of tetracontane particle-concentration at the inlet of the HT-CPC. The HT-CPC particle count increased with increasing inlet concentration. This increase in measured concentration may be due to the volatile contents being re-nucleated when the particle flow was cooled down. The stated PMP volatile-particle protocol of the EU PMP testing described above requires a count of less than 1% of the challenge particles to be measured. Therefore, the various embodiments of the HT-CPC disclosed readily meet the PMP stated requirement.

Figure 7B:
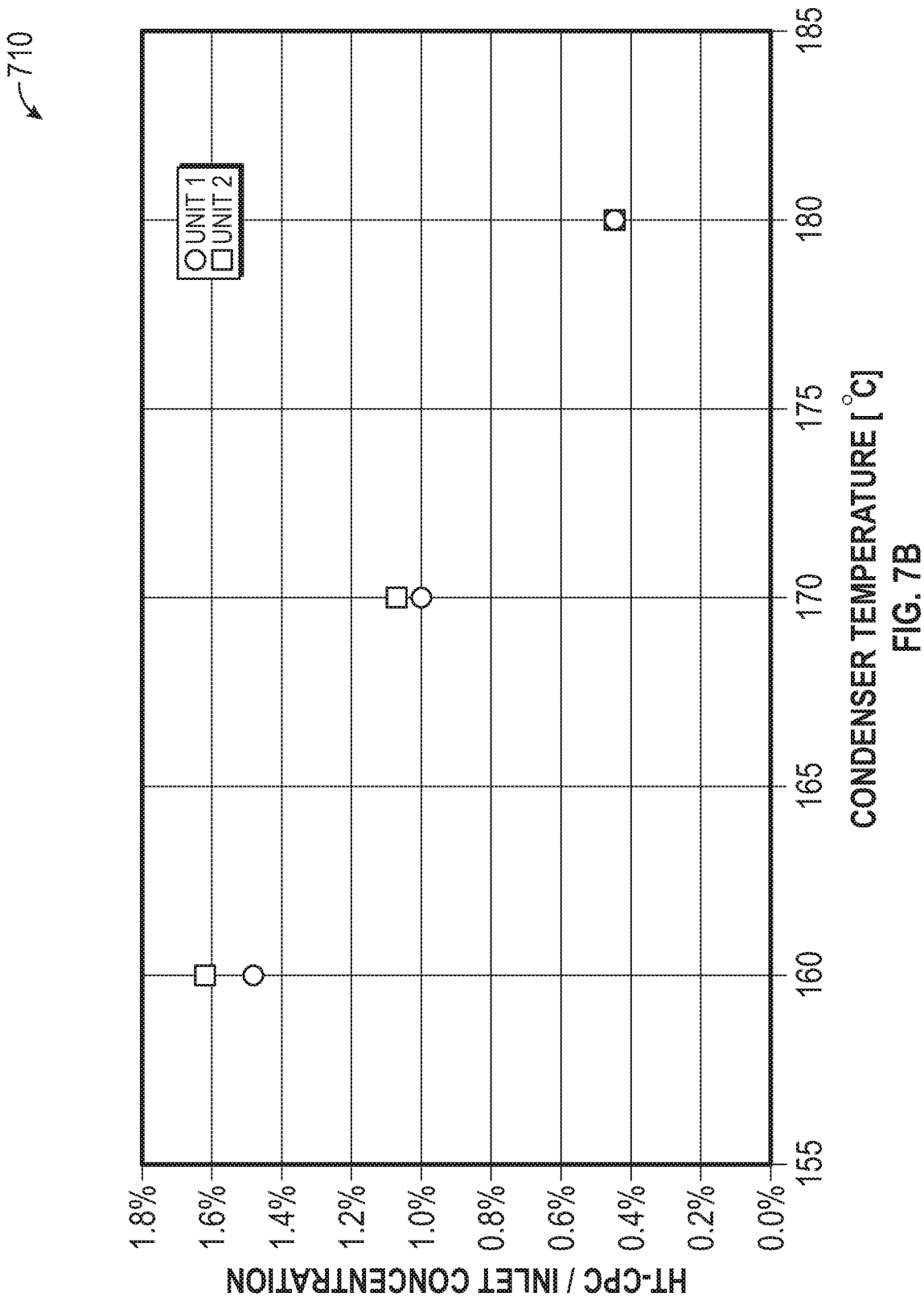
FIG. 7B shows a volatile-particle-test graph for tetracontane particles displayed as an HT-CPC inlet concentration percentage as a function of condenser temperature for two different HT-CPC units designed in accordance with the various embodiments disclosed herein.

FIG. 7B shows a volatile-particle-test graph 710 for tetracontane particles displayed as an HT-CPC inlet concentration percentage as a function of condenser temperature for two different HT-CPC units designed in accordance with the various embodiments disclosed herein. As indicated by the graph 710, the measured HT-CPC/inlet concentration decreases with an increasing condenser temperature.

Figure 7C:
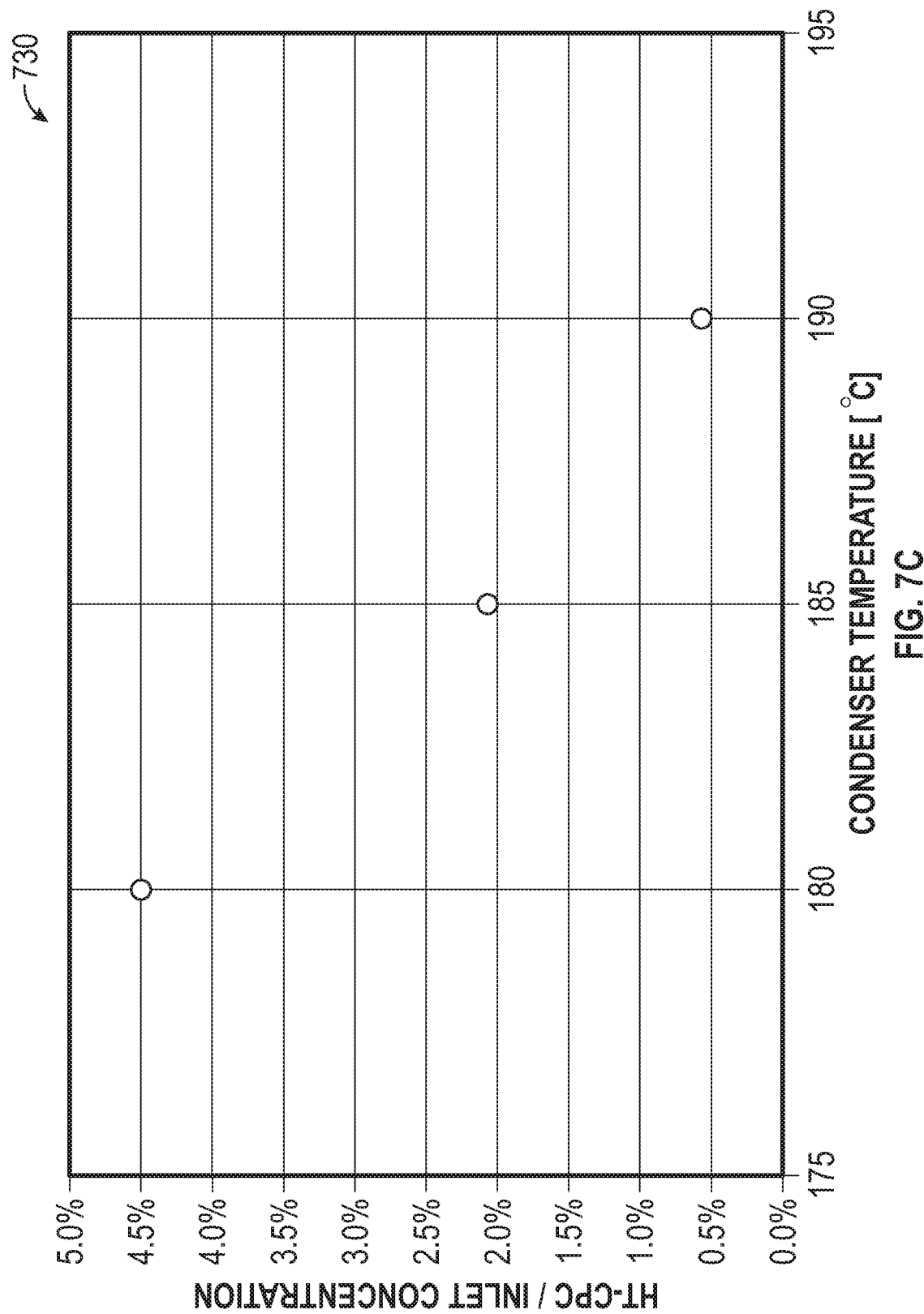
FIG. 7C shows a volatile-particle-test graph for Emery oil particles displayed as an HT-CPC inlet concentration percentage as a function of condenser temperature for HT-CPC units designed in accordance with the various embodiments disclosed herein.

FIG. 7C shows a volatile-particle-test graph 730 for Emery oil particles displayed as an HT-CPC inlet concentration percentage as a function of condenser temperature for 1-IT-CPC units designed in accordance with the various embodiments disclosed herein. As indicated by the graph 710 of FIG. 7A, the measured HT-CPC/inlet concentration of the graph 730 also decreases for with an increasing condenser temperature.

Overall in constructing the various graphs shown above, the false count rate was about 0.01 counts/cm$^3$ for about 1 hour of measurement. The test results are summarized in Table III, below.

TABLE III

Results Summary

| | Test Results |
|---|---|
| $D_{50}$ (NaCl) | Tunable, from about 5 nm to about 23 nm |
| Concentration Limit | >67,000 cm$^{-3}$ |
| Volatile Particles | <0.71% at 64,000 cm$^{-3}$ |
| False Count | 0.01 cm$^{-3}$ |

CONCLUSIONS

As shown and described herein, various exemplary embodiments of the HT-CPC were developed successfully. The performance of the carious embodiments meets the $D_{50}$, concentration limit, and volatile-particle requirements of the PMP.

The shapes of pulses from light detection of the particles were good and the pulse heights in even the initial tests were approximately 350 mV. Also, in the initial work using early version of the various embodiments of the HT-CPC, the counting threshold was set to 200 mV. Noise levels were acceptable as the false count rate was 0.01 cm$^{-3}$. To increase margins on the signal-to-noise ratio for production units, pulse heights larger greater than 500 mV can be used. Results from the various ones of the disclosed embodiments of the HT-CPC units suggested that the pulse heights increase with increasing saturator temperature. However, high saturation temperatures may deplete the working fluid more quickly. An auto-fill function may be used to replenish the working fluid. Also, without the curtain-flow design described herein, a larger amount of working fluid vapors would otherwise condense and deposit on the optics components, thereby requiring more frequent cleaning of the optical elements.

If needed for extremely high particle concentration measurement conditions, an additional dilution step may be used to lower the inlet particle concentration to reduce or eliminate CPC coincidence errors and/or vapor depletion. Also, the dilution flow may be heated to a higher temperature.

Although specific values, ranges of values, and techniques are given for various parameters discussed above, these values and techniques are provided merely to aid the person of ordinary skill in the art in understanding certain characteristics of the designs and embodiments disclosed herein. Those of ordinary skill in the art will realize, upon reading and understanding the disclosure provided herein, that these values and techniques are presented as examples only and numerous other values, ranges of values, techniques, and hardware (including working fluids) may be employed while still benefiting from the novel designs discussed herein that may be employed in various HT-CPC designs. Therefore, the various illustrations of the apparatus are intended to provide a general understanding of the structure and design of various embodiments and are not intended to provide a complete description of all the elements and features of the apparatus that might make use of the structures, features, and designs described herein.

Many modifications and variations can be made, as will be apparent, to a person of ordinary skill in the art upon reading and understanding the disclosure provided herein. Functionally equivalent methods and devices within the scope of the disclosure, in addition to those enumerated herein, will be apparent to a person of ordinary skill in the art from the foregoing descriptions. Portions and features of some embodiments may be included in, or substituted for, those of others. Many other embodiments will be apparent to those of ordinary skill in the art upon reading and understanding the description provided herein. Such modifications and variations are intended to fall within a scope of the appended claims. The present disclosure is therefore to be limited only by the terms of the appended claims, along with the full scope of equivalents to which such claims are entitled. It is also to be understood that the terminology used herein is for the purpose of describing particular embodiments only and is not intended to be limiting.

The Abstract of the Disclosure is provided to allow the reader to quickly ascertain the nature of the technical disclosure. The abstract is submitted with the understanding that it will not be used to interpret or limit the claims. In addition, in the foregoing Detailed Description, it may be seen that various features may be grouped together in a single embodiment for the purpose of streamlining the disclosure. This method of disclosure is not to be interpreted as limiting the claims. Thus, the following claims are hereby incorporated into the Detailed Description, with each claim standing on its own as a separate embodiment.

What is claimed is:

1. A high-temperature condensation particle counter (HT-CPC), comprising:
   a saturator block configured to accept directly a sampled particle-laden gas flow;
   a condenser block located downstream and in fluid communication with the saturator block;
   an optics block located downstream and in fluid communication with the condenser block;
   a makeup-flow block located in fluid communication with and between the condenser block and the optics block; and
   a particle-free gas supply coupled to the makeup-flow block and configured to supply a makeup gas-flow that is substantially free of particles, the particle-free gas supply comprising at least three sections including a make-up gas-supply section, a curtain-flow gas-supply section, and a recirculation gas-supply section.

2. The HT-CPC of claim 1, wherein a temperature of the makeup gas-flow is at about ambient room temperature.

3. The HT-CPC of claim 1, wherein a temperature of the makeup gas-flow is at about a temperature substantially lower than the condenser temperature.

4. The HT-CPC of claim 1, wherein the particle-free gas supply is configured to:
   keep gases flowing into the optics block below a temperature of gases leaving the condenser block;
   dilute excess working fluid vapors and condensable vapors from the gases leaving the condenser block to reduce the vapors from re-nucleating within the optics block; and
   supplement a volumetric flowrate of the sample particle-laden gas flow to maintain an optics gas flowrate at a desired level.

5. The HT-CPC of claim 1, wherein the recirculation gas-supply section is configured to remove excess gas from an output of the optics block to feed gas to the make-up gas-supply section and the curtain-flow gas-supply section.

6. The HT-CPC of claim 1, wherein the make-up flow block comprises a concentric-tube design.

7. The HT-CPC of claim 6, wherein the concentric-tube design of the makeup-flow block is configured to keeps particles from the sampled particle-laden gas flow near a centerline of a flow path in the optics block.

8. A high-temperature condensation particle counter (HT-CPC), comprising:
   a saturator block configured to accept directly a sampled particle-laden gas flow;
   a condenser block located downstream and in fluid communication with the saturator block;
   an optics block located downstream and in fluid communication with the condenser block;
   a makeup-flow block located in fluid communication with and between the condenser block and the optics block;
   a particle-free gas supply coupled to the makeup-flow block and configured to supply a makeup gas-flow that is substantially free of particles; and
   a curtain-flow device in fluid communication with both the particle-free gas supply and the optics block to feed a substantially particle-free gas into the optics block to reduce an amount of particulate contamination and vapor contamination on optical elements within the optics block.

9. The HT-CPC of claim 8, further comprising heaters coupled to the saturator block and to the condenser block to provide heat to maintain a temperature of the saturator block and the condenser block of at least about 200° C. and at least about 160° C., respectively.

10. The HT-CPC of claim 9, wherein the heaters comprise mica heaters.

11. The HT-CPC of claim 9, further comprising at least one proportional-integral-derivative (PID) controller to control the heaters.

12. The HT-CPC of claim 8, wherein the make-up flow block comprises a concentric-tube design.

13. The HT-CPC of claim 12, wherein the concentric-tube design of the makeup-flow block is configured to keeps particles from the sampled particle-laden gas flow near a centerline of a flow path in the optics block.

* * * * *

UNITED STATES PATENT AND TRADEMARK OFFICE
CERTIFICATE OF CORRECTION

| | |
|---|---|
| PATENT NO. | : 11,435,278 B2 |
| APPLICATION NO. | : 17/277723 |
| DATED | : September 6, 2022 |
| INVENTOR(S) | : Hee-Siew Han |

It is certified that error appears in the above-identified patent and that said Letters Patent is hereby corrected as shown below:

In the Specification

In Column 1, Line 9, delete "PARTICLE,"" and insert --PARTICLE COUNTER,"-- therefor In Column 1, Line 10, delete "Provisional." and insert --Provisional-- therefor In Column 1, Line 38, delete "VPR," and insert --VPR-- therefor In Column 1, Line 59, delete "VPR," and insert --VPR-- therefor In Column 2, Line 31, delete "(SNIPS)." and insert --(SMPS).-- therefor In Column 2, Line 66, delete "pump;" and insert --pump,-- therefor In Column 3, Line 21, delete "HT-CPC;" and insert --HT-CPC,-- therefor In Column 4, Line 11, delete "(YPR)." and insert --(VPR).-- therefor In Column 6, Line 21, after "HT-CPC,", insert --all--

In Column 6, Line 26, delete "Macoe-machinable-ceramic" and insert --Macor® machinable-ceramic-- therefor In Column 6, Line 50, delete "Corning" and insert --Corning®-- therefor In Column 7, Line 47, delete "236" and insert --238-- therefor In Column 9, Line 65, after "289B", insert --.--

In Column 10, Line 59, delete "289E" and insert --289B-- therefor

Signed and Sealed this
Twenty-seventh Day of June, 2023

*Katherine Kelly Vidal*

Katherine Kelly Vidal
*Director of the United States Patent and Trademark Office*

CERTIFICATE OF CORRECTION (continued)
U.S. Pat. No. 11,435,278 B2

In Column 12, Line 3, delete "TSL®" and insert --TSI®-- therefor

In Column 13, Line 1, delete "disclosed." and insert --disclosed-- therefor

In Column 14, Line 2, delete "1-IT-CPC" and insert --HT-CPC-- therefor